(12) United States Patent
Sun et al.

(10) Patent No.: US 9,178,756 B2
(45) Date of Patent: Nov. 3, 2015

(54) METHOD AND DEVICE FOR PROCESSING LOCATION INFORMATION OF FAULT POINT

(71) Applicant: Huawei Technologies Co., Ltd., Shenzhen (CN)

(72) Inventors: Changsheng Sun, Nanjing (CN); Yu Zhang, Beijing (CN); Linkun Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 14/081,007

(22) Filed: Nov. 15, 2013

(65) Prior Publication Data

US 2014/0071834 A1    Mar. 13, 2014

Related U.S. Application Data

(63) Continuation of application No. PCT/CN2013/074432, filed on Apr. 19, 2013.

(30) Foreign Application Priority Data

Aug. 30, 2012  (CN) .......................... 2012 1 0315040

(51) Int. Cl.
*H04L 12/24* (2006.01)
*H04L 12/723* (2013.01)
(Continued)

(52) U.S. Cl.
CPC .......... *H04L 41/0677* (2013.01); *H04L 41/065* (2013.01); *H04L 45/28* (2013.01); *H04L 45/50* (2013.01); *H04L 45/507* (2013.01); *H04L 12/437* (2013.01)

(58) Field of Classification Search
CPC ....... H04L 41/065; H04L 45/28; H04L 45/50; H04L 12/437; H04L 43/0811; H04L 12/2602; H04L 45/507
See application file for complete search history.

(56) References Cited

U.S. PATENT DOCUMENTS 7,359,328 B1 *  4/2008  Allan .......................... 370/236.2
2007/0165515 A1    7/2007  Vasseur
(Continued)

FOREIGN PATENT DOCUMENTS

CN     101056203 A    10/2007
CN     101371150 A     2/2009
(Continued)

OTHER PUBLICATIONS

Partial English Translation and Abstract of Chinese Patent Application No. CN101056203A, Aug. 20, 2014, 5 pages.
(Continued)

*Primary Examiner* — Raj Jain
(74) *Attorney, Agent, or Firm* — Conley Rose, P.C.; Grant Rodolph

(57) ABSTRACT

Embodiments of the present invention provide a method and a device for processing location information of a fault point. The method includes: obtaining, by an ingress node of an LDP LSP, first location information of a fault point on a link traversed by the LDP LSP, where the first location information of the fault point includes an identifier of an upstream node of the fault point and an identifier of an interface that is connected to the fault point and located on the upstream node of the fault point; and providing the first location information of the fault point to a user so that the user determines a location of the fault point corresponding to an LDP LSP fault. Therefore, the location of the fault point corresponding to the LDP LSP fault can be determined, and efficiency of troubleshooting specific to the LDP LSP fault can be improved.

34 Claims, 6 Drawing Sheets

(51) Int. Cl.
*H04L 12/703* (2013.01)
*H04L 12/437* (2006.01)

(56) References Cited

U.S. PATENT DOCUMENTS

| | | | |
|---|---|---|---|
| 2007/0280251 A1* | 12/2007 | Wang et al. | 370/395.1 |
| 2008/0068983 A1 | 3/2008 | Dunbar et al. | |
| 2012/0163189 A1* | 6/2012 | Allan et al. | 370/241.1 |
| 2013/0279324 A1 | 10/2013 | Chen et al. | |
| 2014/0010074 A1* | 1/2014 | Ye | 370/228 |
| 2014/0071834 A1* | 3/2014 | Sun et al. | 370/242 |
| 2014/0160918 A1* | 6/2014 | Veerappagowda et al. | 370/218 |

FOREIGN PATENT DOCUMENTS

| | | | |
|---|---|---|---|
| CN | 101505246 A | 8/2009 |
| CN | 101512968 A | 8/2009 |
| CN | 101540637 A | 9/2009 |
| CN | 101621497 A | 1/2010 |
| CN | 102136965 A | 7/2011 |
| CN | 102377601 A | 3/2012 |
| CN | 102833108 A | 12/2012 |
| EP | 1863225 A1 | 5/2007 |

OTHER PUBLICATIONS

Foreign Communication From a Counterpart Application, Chinese Application No. 201210315040.6, Chinese Office Action dated Jun. 26, 2014, 8 pages.

Cavendish, D., et al., "Operation, Administration, and Maintenance in MPLS Networks," OAM in MPLS-Based Networks, IEEE Communications Magazine, Oct. 2004, pp. 91-99.

Fang, L., et al., "LDP Failure Detection and Recovery," OAM in MPLS-Based Networks, IEEE Communications Magazine, Oct. 2004, 117-123 pages.

Foreign Communication From a Counterpart Application, European Application No. 13770830.1, Extended European Search Report dated Nov. 3, 2014, 8 pages.

Partial English Translation and Abstract of Chinese Patent Application No. CN101540637A, Apr. 20, 2015, 33 pages.

Foreign Communication From a Counterpart Application, Chinese Application No. 201210315040.6, Chinese Office Action dated Mar. 9, 2015, 10 pages.

Foreign Communication From a Counterpart Application, PCT Application No. PCT/CN2013/074432, Chinese Search Report dated Jul. 25, 2013, 7 pages.

Foreign Communication From a Counterpart Application, PCT Application No. PCT/CN2013/074432, Chinese Written Opinion dated Jul. 25, 2013, 5 pages.

Andersson, L., et al., "LDP Specification," RFC 3036, Jan. 2001, 174 pages.

Andersson, L., Ed., et al., "LDP Specification," RFC 5036, Oct. 2007, 176 pages.

\* cited by examiner

METHOD AND DEVICE FOR PROCESSING LOCATION INFORMATION OF FAULT POINT

CROSS-REFERENCE TO RELATED APPLICATIONS

This application is a continuation of International Application No. PCT/CN2013/074432, filed on Apr. 19, 2013, which claims priority to Chinese Patent Application No. 201210315040.6, filed on Aug. 30, 2012, both of which are hereby incorporated by reference in their entireties.

TECHNICAL FIELD

The present invention relates to communications technologies, and in particular, to a method and a device for processing location information of a fault point.

BACKGROUND

In a radio communication network, a base station is interconnected with a radio network controller (RNC) of a core network over a radio backhaul bearer network. With explosive growth of radio traffic, higher and higher requirements are imposed on the radio backhaul bearer network. A trend in the communications industry is to use an Internet Protocol (IP) network, such as an IP radio access network (Radio Access Network, RAN for short) as a radio backhaul bearer network.

The IP RAN network bears communication traffic in a typical full-IP manner. On a public network forwarding layer, a label switch path (LSP) generated through signaling negotiation is used for bearing communication traffic; on a service layer, a virtual private network (VPN) is used for bearing communication traffic. Generally, LSP types include a Label Distribution Protocol (LDP) LSP and a Traffic Engineering (TE) LSP. Due to flexible and simple configuration and high extensibility of the LDP LSP, many operators choose an LDP LSP for bearing VPN traffic. In the LSP terminology, generally an initial node of an LSP is referred to as an ingress node, an end node of the LSP is referred to as an egress node, and an intermediate node is referred to as a transit node.

When a link is faulty in an IP RAN network, after detecting the fault, upstream nodes of a fault point and downstream nodes of the fault point will initiate an LDP LSP tearing process directed to the ingress node and the egress node respectively. With the LDP LSP being torn, a user cannot perform troubleshooting specific to an LDP LSP fault effectively.

SUMMARY

Embodiments of the present invention provide a method and a device for processing location information of a fault point so as to determine a location of a fault point and further improve efficiency of troubleshooting specific to an LDP LSP fault.

In a first aspect, an embodiment of the present invention provides a method for sending location information of a fault point, including: obtaining, by an ingress node of a Label Distribution Protocol (LDP) Label Switch Path (LSP), first location information of a fault point on a link traversed by the LDP LSP, where the first location information of the fault point includes an identifier of an upstream node of the fault point and an identifier of an interface that is connected to the fault point and located on the upstream node of the fault point; and providing, by the ingress node, the first location information of the fault point to a user so that the user determines a location of the fault point corresponding to an LDP LSP fault.

In a second aspect, an embodiment of the present invention provides a method for sending location information of a fault point, including: obtaining, by a transit node on a Label Distribution Protocol (LDP) Label Switch Path (LSP), first location information of a fault point on a link traversed by the LDP LSP, where the first location information of the fault point includes an identifier of an upstream node of the fault point and an identifier of an interface that is connected to the fault point and located on the upstream node of the fault point; and sending, by the transit node, the first location information of the fault point to an ingress node of the LDP LSP according to a local label forwarding entry corresponding to the LDP LSP and according to source and destination information of a label corresponding to the local label forwarding entry corresponding to the LDP LSP, so that the ingress node provides a user with the first location information of the fault point corresponding to an LDP LSP fault, where the transit node stores the local label forwarding entry corresponding to the LDP LSP and stores the source and destination information of the label corresponding to the local label forwarding entry corresponding to the LDP LSP before the transit node obtains the first location information of the fault point.

In a third aspect, an embodiment of the present invention provides a method for processing fault alarm information, including: receiving, by a network management device, LDP LSP fault alarm information sent by an ingress node of a Label Distribution Protocol (LDP) Label Switch Path (LSP), where the LDP LSP fault alarm information includes first location information of a fault point on a link traversed by the LDP LSP, and the first location information of the fault point includes an identifier of an upstream node of the fault point and an identifier of an interface that is connected to the fault point and located on the upstream node of the fault point; and determining, by the network management device, a location of the fault point corresponding to an LDP LSP fault according to the first location information of the fault point.

In a fourth aspect, an embodiment of the present invention provides an ingress node device, including: a first obtaining module, configured to obtain first location information of a fault point on a link traversed by a Label Distribution Protocol (LDP) Label Switch Path (LSP), where the first location information of the fault point includes an identifier of an upstream node of the fault point and an identifier of an interface that is connected to the fault point and located on the upstream node of the fault point; and a providing module, configured to provide the first location information of the fault point to a user so that the user determines a location of the fault point corresponding to an LDP LSP fault.

In a fifth aspect, an embodiment of the present invention provides a transit node device, including: a second obtaining module, configured to obtain first location information of a fault point on a link traversed by a Label Distribution Protocol (LDP) Label Switch Path (LSP), where the first location information of the fault point includes an identifier of an upstream node of the fault point and an identifier of an interface that is connected to the fault point and located on the upstream node of the fault point; and a first sending module, configured to send the first location information of the fault point to an ingress node of the LDP LSP according to a local label forwarding entry corresponding to the LDP LSP and according to source and destination information of a label corresponding to the local label forwarding entry corresponding to the LDP LSP, so that the ingress node provides a user with the first location information of the fault point corresponding to an LDP LSP fault, where the transit node device stores the local label forwarding entry corresponding to the LDP LSP and stores the source and destination information of the label corresponding to the local label forwarding entry corresponding to the LDP LSP before the second obtaining module obtains the first location information of the fault point.

In a sixth aspect, an embodiment of the present invention provides a network management device, including: a first receiving module, configured to receive LDP LSP fault alarm information sent by an ingress node of a Label Distribution Protocol (LDP) Label Switch Path (LSP), where the LDP LSP fault alarm information includes first location information of a fault point on a link traversed by the LDP LSP, and the first location information of the fault point includes an identifier of an upstream node of the fault point and an identifier of an interface that is connected to the fault point and located on the upstream node of the fault point; and a determining module, configured to determine a location of the fault point corresponding to an LDP LSP fault according to the first location information of the fault point.

According to the method and the device for sending location information of a fault point in the embodiments of the present invention, after obtaining first location information of a fault point on a link traversed by an LDP LSP, an ingress node of the LDP LSP provides the obtained first location information of the fault point to a user, so that the user can determine a location of the fault point corresponding to an LDP LSP fault, thereby providing conditions for performing troubleshooting according to the determined location of the fault point and improving efficiency of troubleshooting specific to the LDP LSP fault.

According to the method and the device for sending location information of a fault point provided in the embodiments of the present invention, after obtaining first location information of a fault point on a link traversed by an LDP LSP, a transit node on the LDP LSP sends the first location information of the fault point to an ingress node of the LDP LSP, so that the ingress node can provide the first location information of the fault point corresponding to the LDP LSP fault to the user and the user can determine a location of the fault point corresponding to the LDP LSP fault, thereby providing conditions for performing troubleshooting according to the determined location of the fault point and improving efficiency of troubleshooting specific to the LDP LSP fault.

According to the method and the device for processing fault alarm information in the embodiments of the present invention, a network management device obtains first location information of a fault point on a link traversed by an LDP LSP among LDP LSP fault alarm information sent by an ingress node of the LDP LSP, and determines a location of the fault point corresponding to an LDP LSP fault on the link according to the first location information, thereby providing conditions for performing troubleshooting according to the determined location of the fault point and improving efficiency of troubleshooting specific to the LDP LSP fault.

BRIEF DESCRIPTION OF DRAWINGS

To illustrate the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
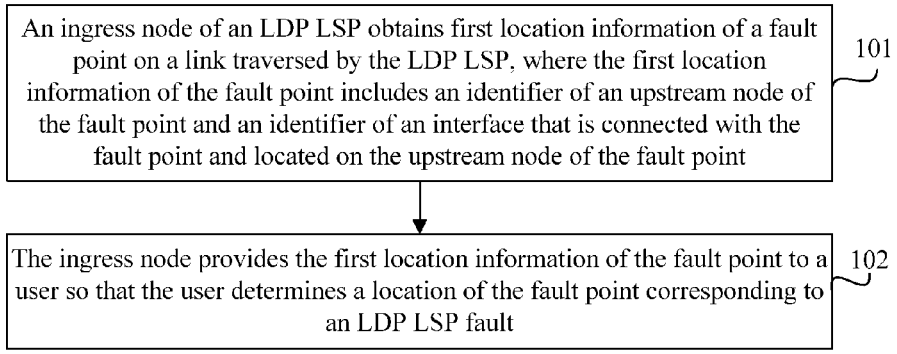
FIG. 1 is a flowchart of a method for sending location information of a fault point according to an embodiment of the present invention.

To make the objectives, technical solutions, and advantages of the embodiments of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

The following embodiments of the present invention are applicable to a network that uses an LDP LSP to bear VPN traffic, such as but without being limited to, an IP RAN network that uses the LDP LSP to bear the VPN traffic. The IP RAN network bears communication traffic in a typical full-IP manner. The IP RAN network not only uses, on a public network forwarding layer, an LSP generated through signaling negotiation and uses a VPN on a service layer, but also uses fibers on a physical layer and uses an Ethernet or a Gigabit Ethernet on a link layer, where signaling is based on a routing protocol and a Multi-Protocol Label Switching (MPLS) suite/Resource Reservation Protocol (RSVP).

Common VPN types include pseudo-wire emulation edge to edge (PWE3), virtual private LAN service (VPLS), and layer-3 VPN (L3VPN). The VPN type used by the IP RAN network depends on the type of base station. If the base station supports an Ethernet interface, L3PVN is generally selected; if the base station does not support Ethernet interfaces but supports only E1 and/or asynchronous transfer mode (ATM) interfaces and the like, PWE3 is selected. The VPN involved in all the following embodiments of the present invention may be any type of VPN.

The IP RAN network is generally formed in a ring networking manner, or in a ring plus chain networking manner. All the following embodiments of the present invention are applicable to various networking manners.

After an LDP LSP is torn due to the fault, a user cannot learn a location of a fault point corresponding to an LDP LSP fault, which leads to low efficiency of troubleshooting. Generally, an ingress node generates LDP LSP fault alarm information and sends it to a network management device, to notify the network management device that the LDP LSP is faulty. The network management device is primarily responsible for monitoring the operation state of a VPN network, and needs to locate fault causes when detecting a fault. However, the LDP LSP fault alarm information sent by the ingress node indicates only occurrence of the fault on the LDP LSP but indicates no specific location of the fault point. Moreover, when the network management device receives the LDP LSP fault alarm information, the LDP LSP has been torn. Therefore, the network management device cannot perform troubleshooting over a path existent before the occurrence of the LDP LSP fault, but can only examine the entire network to locate fault causes according to information such as network understandings and LDP LSP configuration requirements, and make repeated attempts to set up an LDP LSP to confirm removal of the fault, which leads to very low efficiency. The following embodiment of the present invention provides a solution to such a problem.

FIG. 1 is a flowchart of a method for sending location information of a fault point according to an embodiment of the present invention. As shown in FIG. 1, the method in this embodiment includes:

Step 101: An ingress node of an LDP LSP obtains first location information of a fault point on a link traversed by the LDP LSP, where the first location information of the fault point includes an identifier of an upstream node of the fault point and an identifier of an interface that is connected to the fault point and located on the upstream node of the fault point.

In the LDP LSP terminology, an initial node of an LDP LSP is referred to as an ingress node, an end node of the LDP LSP is referred to as an egress node, and an intermediate node is referred to as a transit node. Correspondingly, in the VPN terminology, a VPN endpoint is referred to as a provider edge (PE) node, and a VPN intermediate node is referred to as a provider (P) node. In fact, the ingress node and the egress node of the LDP LSP are two endpoints of the VPN borne by the LDP LSP, that is, the ingress node and the egress node are PE nodes; and the transit node of the LDP LSP is an intermediate node of the VPN borne by the LDP LSP, that is, the transit node is a P node. In all embodiments of the present invention, names in the LDP LSP terminology are employed.

In an LDP LSP, an identifier of each node on the LDP LSP may be expressed by a label switch router (LSR) identifier (ID) of the node. Optionally, the identifier of an upstream node of the fault point in this embodiment may be an LSR ID of the upstream node of the fault point. Optionally, the identifier of an interface may be any information that can uniquely identify an interface, such as an IP address, an index number or a name of the interface. Therefore, the identifier of an interface that is connected to the fault point and located on the upstream node of the fault point may be an IP address, an index number or a name of the interface.

In this embodiment, faults that occur on the link traversed by the LDP LSP may include, but without being limited to, the following faults:

(1) A node on the link traversed by the LDP LSP is faulty, for example, breaks down, where the node may be a node other than the ingress node, that is, the transit node or the egress node is faulty. In this case, the fault point is the faulty node, and the upstream node of the faulty point is the upstream node of the fault point. If the faulty node is a downstream node of the ingress node (that is, a transit node directly connected to the ingress node), the upstream node of the fault point is the ingress node; if the faulty node is a transit node other than the downstream node of the ingress node, the upstream node of the fault point is also a transit node; if the faulty node is an egress node, the upstream node of the faulty node is a transit node directly connected to the egress node.

It is hereby pointed out that, in all embodiments of the present invention, an upstream node of a node refers to a node that is directly connected to the node and located in an upstream direction of the node; and a downstream node of a node refers to a node that is directly connected to the node and located in a downstream direction of the node. The upstream direction refers to being upstream in the traffic direction of the LDP LSP, and the downstream direction refers to being downstream in the traffic direction of the LDP LSP. For example, if the traffic flows from the ingress node to the egress node, the upstream direction refers to a direction close to the ingress node, and the downstream direction refers to a direction close to the egress node.

(2) A link between any two directly connected nodes on the link traversed by the LDP LSP is faulty, for example, the link is cut off, where the two directly connected nodes may be an ingress node and its downstream node (which is a transit node), or may be any two directly connected transit nodes, or may be an egress node and its upstream node (which is a transit node). In this case, the fault point is the faulty link, and the upstream node of the fault point is an upstream node that is connected between two nodes on the link and located in the traffic direction, and, if the faulty link is a link between the ingress node and its downstream node, the upstream node of the fault point is an ingress node.

(3) On any two directly connected nodes on the link traversed by the LDP LSP, configuration information about the LDP LSP is mismatched, where the two directly connected nodes may be an ingress node and its downstream node (which is a transit node), or may be any two directly connected transit nodes, or may be an egress node and its upstream node (which is a transit node). In this case, the two directly connected nodes are fault points of each other. This embodiment only considers a scenario that, in two directly connected nodes, the fault point of an upstream node located in the traffic direction is a downstream node located in the traffic direction; and, in this case, the upstream node of the fault point is the upstream node located in the traffic direction in the two directly connected nodes. If the two directly connected nodes are an ingress node and its downstream node, this embodiment is described through an example where the fault point is the downstream node of the ingress node, and the upstream node of the fault point is the ingress node.

In view of the several fault scenarios described above, it can be known that there are different manners for the ingress node of the LDP LSP to obtain the first location information of the fault point on the link traversed by the LDP LSP.

If the fault occurs between the ingress node and the downstream node of the ingress node, the ingress node may use the following manners to obtain the first location information of the fault point on the link traversed by the LDP LSP:

When perceiving a fault of the link between the ingress node and the downstream node of the ingress node or perceiving a fault of the downstream node of the ingress node, the ingress node determines that the fault point is the link between the ingress node and its downstream node or is the downstream node of the ingress node, and determines that the ingress node itself is an upstream node of the fault point, and therefore, obtains an identifier of the ingress node itself and an identifier of an interface that is connected to the downstream node of the ingress node and located on the ingress node, and uses the identifiers as the first location information of the fault point. Generally, the ingress node can directly perceive or monitor whether an exception occurs on the link between the ingress node and the downstream node of the ingress node, and on the downstream node of the ingress node. For another example, the ingress node may make a judgment indirectly, for example, depending on a route convergence result, two scenarios are considered: a routing forwarding entry is deleted and a next hop of the deleted routing forwarding entry matches an address in an address (Address) message sent by the downstream node of the ingress node and recorded by the ingress node, that is, the next hop of the deleted routing forwarding entry is one of addresses announced by the downstream node; and the routing forwarding entry changes and a next hop of the original routing forwarding entry matches an address in the address (Address) message received by the ingress node but the next hop of the changed routing forwarding entry mismatches the address in the address (Address) message recorded by the ingress node, that is, the next hop of the original routing forwarding entry is one of addresses announced by the downstream node, and the next hop of the changed routing forwarding entry is no longer an address announced by the downstream node. In the two scenarios, the ingress node may determine that a fault occurs on the link between the ingress node and its downstream node, or on its downstream node. This determining manner is easier to implement than perception of the fault itself.

Alternatively, when perceiving mismatch between configuration information corresponding to the LDP LSP on the ingress node and configuration information corresponding to the LDP LSP on the downstream node of the ingress node, the ingress node may determine that the fault point is the downstream node of the ingress node and that the ingress node itself is an upstream node of the fault point, and therefore, obtains an identifier of the ingress node itself and an identifier of an interface that is connected to the downstream node of the ingress node and located on the ingress node, and uses the identifiers as the first location information of the fault point. The configuration information here mainly includes but is not limited to: an IP address configured for an interface traversed by the LDP LSP (which should match the IP address of a correspondent node), MPLS enabling, LDP enabling, LDP protocol version, label distribution mode, keep alive (Keepalive) time, and so on. Based on this, mismatch of configuration information in this embodiment includes but is not limited to: mismatch of IP addresses of interfaces on both ends of a link traversed by the LDP LSP, MPLS is not enabled on at least one of the two interfaces on both ends of the link traversed by the LDP LSP, LDP is not enabled on at least one of the two interfaces on both ends of the link traversed by the LDP LSP, the LDP protocol version is different, the label distribution mode is different, and the keep alive time is inconsistent.

The manner for the ingress node to perceive that configuration information on the ingress node and configuration information on the downstream node of the ingress node are different may be: the ingress node deletes local configuration information, for example, deletes the IP address of the interface traversed by the LDP LSP, deletes MPLS enabling, deletes LDP enabling, or the like. In addition, the ingress node may receive from its downstream node a message that carries configuration information of the downstream node side, such as a keep alive (Keepalive) message, extract configuration information of the correspondent node (that is, the downstream node), and then compare the extracted configuration information of the correspondent node with the local configuration information. If the corresponding configuration information fails to be matched, the configuration is mismatched, and the LDP LSP fails to work normally. The configuration information carried in the Keepalive message may include LDP protocol version, label distribution mode, Keepalive time, and so on. Optionally, if the ingress node perceives timeout of transmission between the ingress node and its downstream node, it is possibly because the configuration information is mismatched between the two. However, transmission timeout is not all caused by mismatch of configuration information, but both sides cannot communicate with each other normally, no matter which causes the transmission timeout.

Therefore, when perceiving timeout of transmission between the ingress node and the downstream node of the ingress node, the ingress node obtains an identifier of the ingress node and an identifier of an interface that is connected to the downstream node of the ingress node and located on the ingress node, and uses the identifiers as the first location information of the fault point. In this manner, the ingress node is an upstream node of the fault point. The manner used by the ingress node to perceive timeout of transmission between the ingress node and the downstream node of the ingress node may depend on the device vendor and the application scenario. For example, a Keepalive packet or a packet similar to the Keepalive packet is sent between the ingress node and the downstream node of the ingress node to keep connection. If the ingress node fails to receive the packet within a specified reception time, the ingress node may determine timeout of transmission between the ingress node and its downstream node, and determine occurrence of a fault.

If the fault does not occur between the ingress node and the downstream node of the ingress node, but occurs between two transit nodes or occurs between an egress node and its upstream node, the ingress node may use the following manner to obtain the first location information of the fault point on the link traversed by the LDP LSP:

The ingress node receives the first location information of the fault point sent by the upstream node of the fault point. After perceiving the fault, the upstream node of the fault point obtains its identifier and an identifier of an interface that is connected to the fault point and located on the upstream node, uses the identifiers as the first location information of the fault point, and then sends the first location information of the fault point to the ingress node. The ingress node receives the first location information of the fault point sent by the upstream node of the fault point.

Optionally, the upstream node of the fault point may use, but without being limited to, the following manners to send the first location information of the fault point to the ingress node.

The first manner is: the upstream node of the fault point may define a new type of LDP message, such as an LDP fault information transfer message, where the first location information of the fault point is carried in the LDP fault information transfer message and sent to the ingress node. The LDP fault information transfer message is independent of the existing standard LDP message such as address (Address) message, address withdraw (Address Withdraw) message, label mapping (Label Mapping) message, label request (Label Request) message, label abort request (Label Abort Request) message, label withdraw (Label Withdraw) message, and label release (Label Release) message. This manner is better compatible with the standard.

The second manner is: the upstream node of the fault point extends an existing LDP message, where the first location information of the fault point is carried in the extended LDP message and sent to the ingress node. For example, a label withdraw message in the existing LDP message may be extended, and the first location information of the fault point may be carried in the extended label withdraw message and sent to the ingress node. Not only the label withdraw message can be extended, but also other messages may be extended, such as address withdraw message, label mapping message, label request message, or label abort request message, and the first location information of the fault point may be carried in the extended message and sent to the ingress node. The manner of extending the existing LDP message is not limited. For example, a new field may be added to carry the first location information of the fault point; or an existing field may be redefined to carry the first location information of the fault point, and so on. For example, the newly-added field may be, but without being limited to, a type-length-value (TLV) field.

Described from a perspective of the manner of carrying the first location information of the fault point, the foregoing two manners are mainly about the manner for the upstream node of the fault point to send the first location information of the fault point to the ingress node.

Based on the above, the ingress node in this embodiment may use, but without being limited to, the following manners to receive the first location information of the fault point sent by the upstream node of the fault point:

The ingress node receives an LDP fault information transfer message sent by the upstream node of the fault point, where the LDP fault information transfer message includes the first location information of the fault point. The LDP fault information transfer message is a newly-added new type of LDP message.

Alternatively the ingress node receives a label withdraw message sent by the upstream node of the fault point, where the withdraw message includes the first location information of the fault point. The label withdraw message is an extended label withdraw message, where, not only the label withdraw message can be extended, but also other existing LDP messages can be extended, such as address withdraw message, label mapping message, label request message, or label abort request message.

Figure 2A:
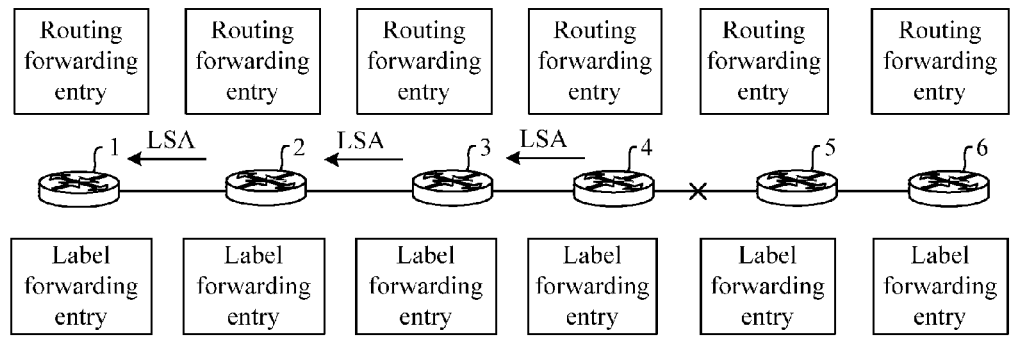
FIG. 2A to FIG. 2D are schematic diagrams of an LDP LSP tearing process according to an embodiment of the present invention.
Figure 2B:
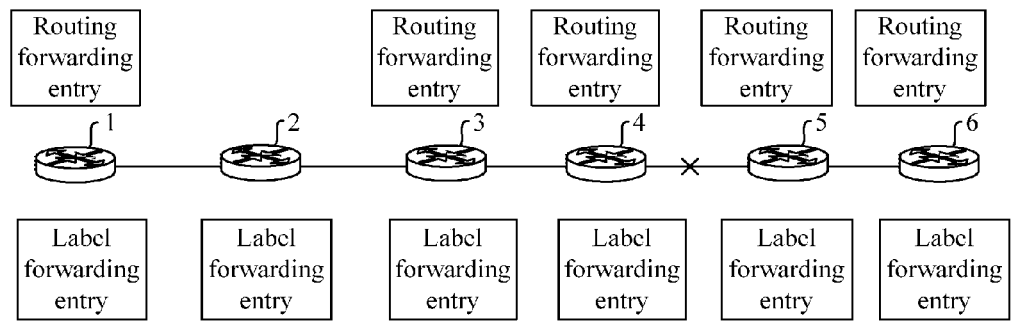
Figure 2C:
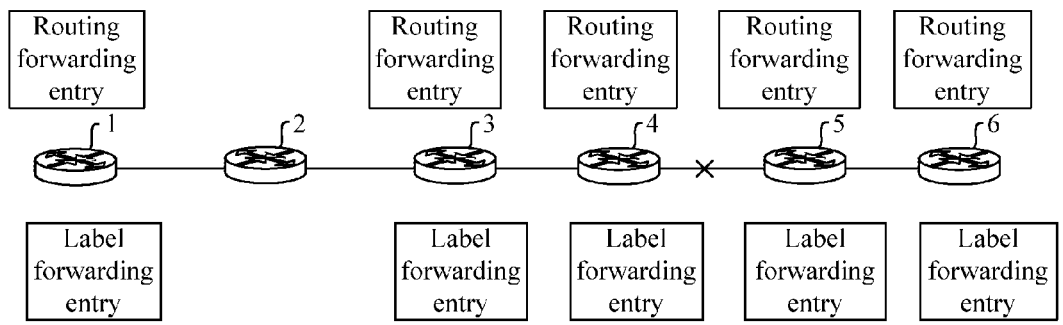
Figure 2D:
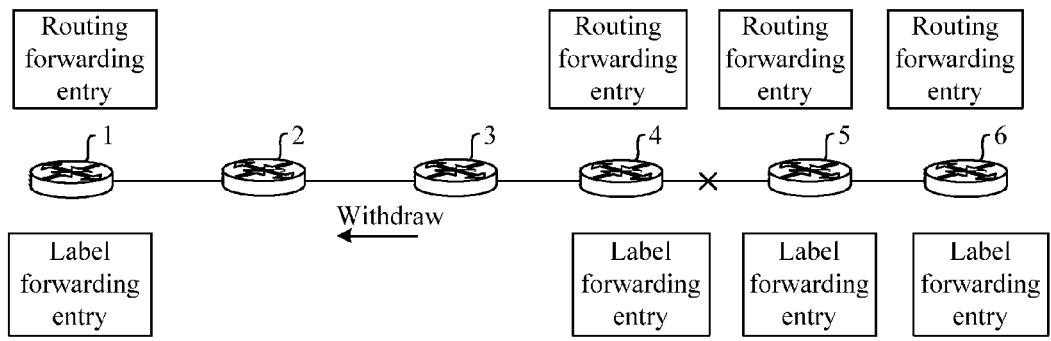

As shown in FIG. 2A to FIG. 2D, an existing LDP LSP tearing process includes: the upstream node of the fault point (that is, the transit node 4) detects the fault, and regenerates a routing link-state advertisement (LSA) message and performs flooding. Upstream nodes of the transit node 4, that is, transit node 3, transit node 2, and ingress node 1, will receive the LSA message sent by the transit node 4. Subsequently, each node that receives the LSA message re-calculates the route and refreshes a routing forwarding table, that is, deletes routing forwarding entries that arrive at an egress node. Each node has a different capability of calculating routes. Therefore, the existing order of deleting the routing forwarding entries is uncertain. As shown in FIG. 2B, the transit node 2 first deletes the local routing forwarding entry that arrives at the egress node. After refreshing the routing forwarding table, each node updates a local label forwarding table according to the refreshed routing forwarding table. That is, if the routing forwarding entry that arrives at the egress node is deleted, the label forwarding entry corresponding to the routing forwarding entry is deleted, and source and destination information of a label related to the label forwarding entry is deleted. Because the order of each node in deleting the routing forwarding entry is uncertain, the order of each node in deleting the label forwarding entry corresponding to the routing forwarding entry and the source and destination information of the label related to the label forwarding entry is also uncertain. As shown in FIG. 2C, the transit node 2 first deletes the corresponding label forwarding entry and the source and destination information of the label corresponding to the label forwarding entry. In addition, after deleting a local label forwarding entry, any node will continue to request its upstream node to delete a corresponding forwarding equivalence class (FEC) label. As shown in FIG. 2D, after deleting a local label forwarding entry, the transit node 3 sends a label withdraw message to the transit node 2, to request the transit node 2 to delete the corresponding FEC label.

As shown in the above description, in an LDP LSP tearing process defined in the Request for Comments (RFC) standard, when a link fault occurs on a transit node, a node on an LDP LSP deletes a label forwarding entry corresponding to the LDP LSP according to two trigger actions. One trigger action is a route convergence result of this node. If this node deletes a routing forwarding entry, it deletes a label forwarding entry corresponding to the routing forwarding entry synchronously. The other trigger action is a request of a downstream node in the traffic forwarding direction of the LDP LSP. If a downstream node deletes a label forwarding entry, the downstream node requests the upstream node to delete the corresponding label forwarding entry. That is, according to a result of routes learned by itself and a label deletion request of the downstream node, each node on the LDP LSP decides whether to delete the label forwarding entry. The time of each node learning routes and updating the routes depends on packet flooding time of the routing protocol and the route computation capability of this node. There is no fixed order of time of each node updating the routes, and therefore, there is no fixed order for each node on the LDP LSP to delete the label forwarding entry. For example, an upstream node of the LDP LSP may have deleted the label forwarding entry while a downstream node of the LDP LSP has not deleted the label forwarding entry. In this case, the downstream node is not capable of transferring the first location information of the fault point to the ingress node even if it intends to.

In order for the upstream node of the fault point to transfer the first location information of the fault point to the ingress node successfully, this embodiment provides a solution. The main idea of this solution is: before receiving the first location information of the fault point, each node on the LDP LSP stores a local label forwarding entry corresponding to the LDP LSP and stores source and destination information of a label corresponding (or related) to the label forwarding entry (no matter whether the corresponding routing forwarding entry has been deleted, and whether a label withdraw message is received), and then, after obtaining the first location information of the fault point on a link traversed by the LDP LSP, continues to forward the first location information of the fault point to its upstream node according to the locally stored label forwarding entry corresponding to the LDP LSP and source and destination information of the label corresponding to the label forwarding entry, until the first location information arrives at the ingress node. Here the stored label forwarding entry and the source and destination information of the label corresponding to the label forwarding entry are primarily used to provide a path for sending the first location information of the fault point to the upstream node. The source and destination information of the label corresponding to the label forwarding entry of a node is actually a record of information about a label allocated by a downstream node of the node to this node for an FEC, and information about a label allocated by this node to its upstream node for the same FEC, and is equivalent to a record of information about upstream and downstream nodes of this node for an FEC on an LDP LSP forwarding path.

In an optional implementation manner, after the first location information of the fault point is forwarded to its upstream node, if the routing forwarding entry corresponding to the stored label forwarding entry is deleted or a label withdraw message sent by its downstream message is received, the stored label forwarding entry and the stored source and destination information of the label may be deleted.

In an optional implementation manner, each node may employ a timeout mechanism. That is, if a node fails to receive the first location information of the fault point sent by its downstream node within a preset reception time, the stored label forwarding entry and the stored source and destination information of the label may be deleted.

It is hereby pointed out that in specific implementation, the foregoing optional implementation manners may be combined.

In addition, after the routing forwarding entry corresponding to the label forwarding entry is deleted, the label forwarding entry is not available for forwarding actual LDP LSP traffic. For that cause, each node may flag the label forwarding entry so that the flagged label forwarding entry is no longer used for forwarding LDP LSP traffic. For example, the flagging manner may be: adding a flag bit in the label forwarding entry, setting the flag bit to 0 in a normal case (that is, a case in which the label forwarding entry is available for forwarding LDP LSP traffic), and setting the flag bit to 1 if the corresponding routing forwarding entry is deleted but the corresponding label forwarding entry is still existent and available for providing a path for sending the first location information of the fault point to the upstream node (that is, the label forwarding entry is not available for forwarding LDP LSP traffic). Each node may delete an original label forwarding entry not only by flagging, but also by copying the label forwarding entry such as copying the original label forwarding entry and storing the copied label forwarding entry. In this way, because the original label forwarding entry is deleted, the purpose of no longer performing actual LDP LSP traffic forwarding is achieved, and the copied label forwarding entry is available for providing a path for sending the first location information of the fault point to the upstream node.

The following describes the source and destination information of the label corresponding to the label forwarding entry. On the LDP LSP, when a node on the LDP LSP distributes a label to its upstream nodes, the node records the upstream node to which the label is distributed (that is, destination information of the label), and the upstream node also records the downstream node from which the label comes (that is, source information of the label). As shown in FIG. 2A, assuming that a transit node 4 allocates a label L2 to its upstream node (that is, transit node 3), and a downstream node (that is, transit node 5) of the transit node 4 allocates a label L3 to the transit node. Therefore, for the transit node 4, the destination information of the label L2 thereon indicates that the label is allocated by the transit node 4 to its upstream node, that is, the transit node 3; and the source information of the label L3 thereon indicates that the label is allocated by the downstream node, that is, the transit node 5, to the transit node 4. The corresponding label is stored in the label forwarding entry. Therefore, each node records an FEC according to the label forwarding entry and the source and destination information of the label corresponding to the label forwarding entry, that is, records the upstream and downstream nodes of the node on the LDP LSP, thereby providing an information transmission path.

Based on the above, in an optional implementation manner, at least one node is connected between the ingress node and the upstream node of the fault point. The at least one node here is transit node(s).

Based on this, an optional manner for the upstream node of the fault point to send the first location information of the fault point to the ingress node is: the upstream node of the fault point sends the first location information of the fault point to the ingress node by using at least one node between the upstream node and the ingress node. Correspondingly, the manner for the ingress node to receive the first location information of the fault point sent by the upstream node of the fault point is: the ingress node receives the first location information of the fault point that is sent by the upstream node of the fault point by using the at least one node between the ingress node and the upstream node of the fault point. Before receiving the first location information of the fault point sent by a downstream node, each of the at least one node stores a local label forwarding entry corresponding to the LDP LSP and stores source and destination information of a label corresponding to the local label forwarding entry corresponding to the LDP LSP, so that each of the at least one node sends the first location information of the fault point to its upstream node according to the stored local label forwarding entry corresponding to the LDP LSP and the stored source and destination information of the label corresponding to the local label forwarding entry corresponding to the LDP LSP.

Step 102: the ingress node provides the first location information of the fault point to a user so that the user determines a location of the fault point corresponding to an LDP LSP fault.

An optional implementation manner of step 102 is: the ingress node provides the user with an interface for directly querying the first location information of the fault point or a similar function. Therefore, after learning the LDP LSP fault, the user may log in to the ingress node directly and input a query command that carries identification information of the LDP LSP. Correspondingly, the ingress node receives the query command input by the user, determines location information of the fault point corresponding to the LDP LSP fault according to the identification information of the LDP LSP in the query command, and displays the location information of the fault point corresponding to the LDP LSP fault to the user, and therefore, the user may learn the location of the fault point corresponding to the LDP LSP fault. Based on this, the user can perform troubleshooting specific to the LDP LSP fault according to the location of the fault point, thereby improving efficiency of troubleshooting.

Another optional implementation manner of step 102 is: After obtaining the first location information of the fault point, the ingress node provides the first location information of the fault point to a network management device so that the user determines the location of the fault point corresponding to the LDP LSP fault by using the network management device. In this way, when the ingress node sends an LDP LSP fault alarm to the network management device, the network management device may know the location of the fault point corresponding to the LDP LSP fault alarm according to the received first location information of the fault point. Then, the network management device may display the determined corresponding relationship between the LDP LSP fault alarm and the location information of the fault point to the user so that the user learns the location of the fault point corresponding to the LDP LSP fault and perform troubleshooting efficiently. Optionally, the network management device may locate fault causes according to the determined location of the fault point, which can improve efficiency of troubleshooting specific to the LDP LSP significantly compared with the entire-network troubleshooting.

This embodiment sets no limitation on the manner that the ingress node provides the first location information of the fault point to the network management device. For example, the ingress node may provide the first location information of the fault point separately to the network management device. Preferably, before or after providing the first location information of the fault point to the network management device, the ingress node may send LDP LSP fault alarm information to the network management device, so that the network management device learns that the LDP LSP is faulty and can determine the location of the fault point on a link corresponding to the faulty LDP LSP according to the received first location information of the fault point.

An exemplary implementation manner for the ingress node to provide the first location information of the fault point to the network management device so that the network management device determines the location of the fault point corresponding to the LDP LSP fault by using the network management device is: after receiving the first location information of the fault point, the ingress node generates LDP LSP fault alarm information that carries the first location information of the fault point, and sends the LDP LSP fault alarm information to the network management device, and therefore, according to the LDP LSP fault alarm information, the network management device determines the location of the fault point corresponding to the LDP LSP fault alarm sent by the ingress node. This manner is good for reducing interactions between the ingress node and the network management device, saving resources, improving compactness between the LDP LSP fault alarm information and the first location information of the fault point, and improving accuracy of the network management device in determining the location of the fault point on the link.

Another exemplary implementation manner for the ingress node to provide the first location information of the fault point to the network management device so that the user determines the location of the fault point corresponding to the LDP LSP fault by using the network management device is: the ingress node receives a location information obtaining request sent by the network management device, and provides the first location information of the fault point to the network management device according to the location information obtaining request, so that the user determines the location of the fault point corresponding to the LDP LSP fault by using the network management device. The location information obtaining request carries identification information of the LDP LSP. The identification information of the LDP LSP may be any information that can uniquely identify an LSP, such as an ID or a name of the LSP.

In an optional implementation manner, considering that the number of LDP LSP fault alarms is relatively high when the network scale is large, in order to reduce the number of LDP LSP fault alarms, the ingress node may generate LDP LSP fault alarm information that carries the first location information of the fault point if the ingress node determines that the LDP LSP bears VPN traffic and that no other LDP LSP is available for bearing the VPN traffic borne by the LDP LSP, and then send the generated LDP LSP fault alarm information to the network management device. That is, if an LDP LSP is faulty but the LDP LSP does not actually bear any VPN traffic, no fault alarm needs to be raised; or, even if the LDP LSP bears VPN traffic but the VPN traffic borne by it can be offloaded to another LDP LSP, no fault alarm needs to be raised, thereby reducing the number of LDP LSP fault alarms.

Based on the exemplary implementation manners, the ingress node may use LDP LSP fault alarm information to carry a fault cause corresponding to the fault point, so that the network management device can understand the cause of the fault on the link directly. The fault cause corresponding to the fault point may be: a fault of a node on the link where the LDP LSP is located, a fault of a link between two directly connected nodes on the link where the LDP LSP is located, or mismatch of configuration information corresponding to the LDP LSP on two directly connected nodes on the link where the LDP LSP is located, and so on.

The following describes an optional implementation manner of the LDP LSP fault alarm information generated by the ingress node and carrying the first location information of the fault point. The content included in the LDP LSP fault alarm information is as shown in Table 1.

TABLE 1

| Content in the LDP LSP fault alarm information | Meaning |
| --- | --- |
| hwMplsLdpLspFec | Forwarding equivalence class (that is, a destination route corresponding to the LSP) |
| hwMplsLdpLspInLabel | LSP ingress label |
| hwMplsLdpLspOutLabel | LSP egress label |
| hwMplsLdpLspOutIfIndex | LSP egress interface |
| hwMplsLdpLspDownReason | LSP fault cause |
| hwMplsFaultyTransitLSRID | LSR ID of an upstream node of the LSP fault point |
| hwMplsFaultyTransitIP | IP of an interface connected to the fault point on an upstream node of the LSP fault point |

The LDP LSP fault alarm information in this embodiment is not limited to Table 1. Different vendors may define their own private LDP LSP fault alarm information. This embodiment primarily extends it to carry the first location information of the fault point.

As seen from the above description, in the method for sending location information of a fault point provided in this embodiment, after obtaining first location information of a fault point on a link traversed by an LDP LSP, an ingress node of the LDP LSP provides the obtained first location information of the fault point to a user or a network management device, so that the user or the network management device can determine a location of the fault point corresponding to an LDP LSP fault, thereby providing conditions for performing troubleshooting according to the determined location of the fault point and improving efficiency of troubleshooting specific to the LDP LSP fault.

Figure 3:
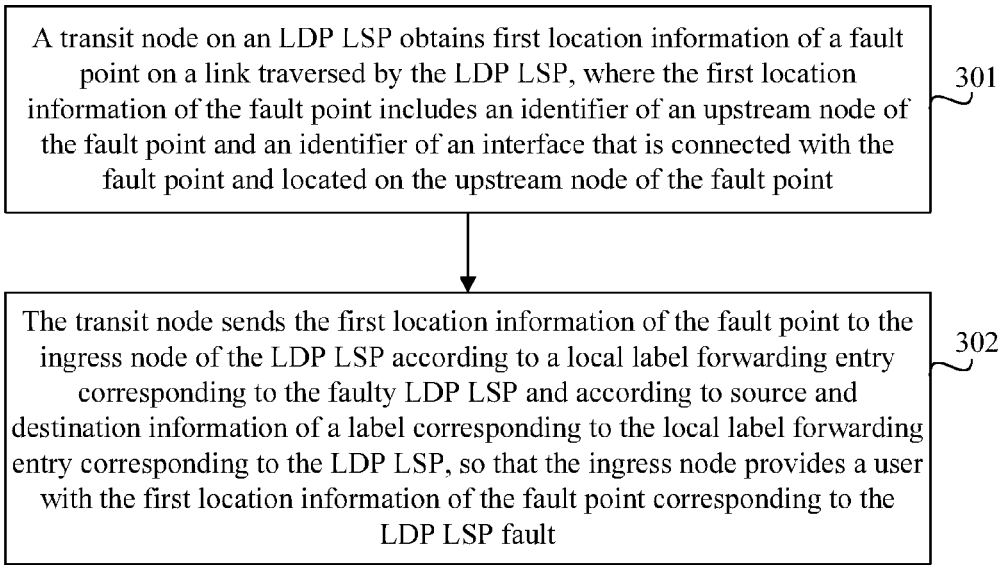
FIG. 3 is a flowchart of a method for sending location information of a fault point according to another embodiment of the present invention.

FIG. 3 is a flowchart of a method for sending location information of a fault point according to another embodiment of the present invention. As shown in FIG. 3, the method in this embodiment includes:

Step 301: A transit node on an LDP LSP obtains first location information of a fault point on a link traversed by the LDP LSP, where the first location information of the fault point includes an identifier of an upstream node of the fault point and an identifier of an interface that is connected to the fault point and located on the upstream node of the fault point.

In the LDP LSP terminology, an initial node of an LDP LSP is referred to as an ingress node, an end node of the LDP LSP is referred to as an egress node, and an intermediate node is referred to as a transit node. Correspondingly, in the VPN terminology, a VPN endpoint is referred to as a PE node, and a VPN intermediate node is referred to as a P node. In fact, the ingress node and the egress node of the LDP LSP are two endpoints of the VPN borne by the LDP LSP, that is, the ingress node and the egress node are PE nodes; and the transit node of the LDP LSP is an intermediate node of the VPN borne by the LDP LSP, that is, the transit node is a P node. In all embodiments of the present invention, names in the LDP LSP terminology are employed.

In an LDP LSP, an identifier of each node on the LDP LSP may be expressed by an LSR ID of the node. Optionally, the identifier of the transit node in this embodiment may be an LSR ID of the transit node. Optionally, the identifier of an interface may be any information that can uniquely identify an interface, such as an IP address, an index number or a name of the interface. Therefore, the identifier of an interface that is connected to the fault point and located on the transit node may be an IP address, an index number or a name of the interface.

In this embodiment, faults that occur on the link traversed by the LDP LSP may include, but without being limited to, the following faults:

(1) A node on the link traversed by the LDP LSP is faulty, for example, breaks down.

(2) A link between any two directly connected nodes on the link traversed by the LDP LSP is faulty, for example, the link is cut off.

(3) On any two directly connected nodes on the link traversed by the LDP LSP, configuration information about the LDP LSP is mismatched.

(4) Transmission timeout occurs between any two directly connected nodes on the link traversed by the LDP LSP.

For detailed description about the foregoing fault scenarios, reference may be made to the embodiment shown in FIG. 1, which will not be described in detail herein again. However, in this embodiment, only various fault scenarios where the upstream node of the fault point is used as a transit node are described.

In view of the several fault scenarios described above, it can be known that that there are different manners for the transit node in this embodiment to obtain the first location information of the fault point on the link traversed by the LDP LSP. For example, if the transit node in this embodiment is an upstream node of the fault point, when perceiving a fault of the link between the transit node and a downstream node of the transit node or perceiving a fault of a downstream node of the transit node, the transit node in this embodiment may determine that the fault point is the link between the transit node and the downstream node of the transit node or is the downstream node of the transit node, and may determine that the transit node itself is an upstream node of the fault point, and therefore, obtain an identifier of the transit node itself and an identifier of an interface that is connected to its downstream node and located on the transit node, and uses the identifiers as the first location information of the fault point. Generally, the transit node in this embodiment can directly perceive or monitor whether an exception occurs on the link between the transit node and the downstream node of the transit node, and on the downstream node of the transit node. In addition, the transit node in this embodiment may make a judgment indirectly, for example, depending on a route convergence result, two scenarios are considered: a routing forwarding entry is deleted, and a next hop of the deleted routing forwarding entry matches an address in an address (Address) message sent by the downstream node of the transit node and recorded by the transit node, that is, the next hop of the deleted routing forwarding entry is one of addresses announced by the downstream node; and the routing forwarding entry changes and a next hop of an original routing forwarding entry matches an address in the address (Address) message received by the transit node but a next hop of the changed routing forwarding entry mismatches an address in an address (Address) message recorded by the transit node. In the two scenarios, the transit node may determine that a fault occurs on the link between the transit node and the downstream node of the transit node, or on the downstream node of the transit node. This determining manner is easier to implement than perception of the fault itself.

Alternatively, if the transit node in this embodiment is an upstream node of the fault point, when perceiving mismatch between configuration information corresponding to the LDP LSP on the transit node and configuration information corresponding to the LDP LSP on the downstream node of the transit node, the transit node in this embodiment may determine that the downstream node of the transit node is the fault point, and determine that the transit node itself is an upstream node of the fault point, and therefore, may obtain an identifier of the transit node itself and an identifier of an interface that is connected to the downstream node of the transit node and located on the transit node, and uses the identifiers as the first location information of the fault point. The configuration information here mainly includes but is not limited to: an IP address configured for an interface traversed by the LDP LSP (which should match the IP address of the correspondent node), MPLS enabling, LDP enabling, LDP protocol version, label distribution mode, keep alive (Keepalive) time, and so on. Based on this, mismatch of configuration information in this embodiment includes but is not limited to: mismatch of IP addresses of interfaces on both ends of a link traversed by the LDP LSP, MPLS is not enabled on at least one of the two interfaces on both ends of the link traversed by the LDP LSP, LDP is not enabled on at least one of the two interfaces on both ends of the link traversed by the LDP LSP, the LDP protocol version is different, the label distribution mode is different, and the keep alive time is inconsistent.

The manner for the transit node in this embodiment to perceive the mismatch between configuration information on the transit node and configuration information on the downstream node of the transit node are different may be: the transit node deletes local configuration information, for example, deletes the IP address of the interface traversed by the LDP LSP, deletes MPLS enabling, deletes LDP enabling, or the like. In addition, the transit node in this embodiment may receive a message that carries configuration information of the downstream node side and is sent by its downstream node, such as a keep alive (Keepalive) message, extract configuration information of a correspondent node (that is, the downstream node), and then compare the extracted configuration information of the correspondent node with the local configuration information. If the corresponding configuration information fails to be matched, the configuration is mismatched, and the LDP LSP fails to work normally. The configuration information carried in the Keepalive message may include LDP protocol version, label distribution mode, Keepalive time, and so on. Optionally, if the transit node perceives timeout of transmission between the transit node and its downstream node, it is possibly because the configuration information is mismatched between the two. However, transmission timeout is not all caused by mismatch of configuration information, but both sides cannot communicate with each other normally, no matter which causes the transmission timeout.

Therefore, when perceiving timeout of transmission between the transit node and the downstream node of the transit node, the transit node obtains an identifier of the transit node and an identifier of an interface that is connected to the downstream node of the transit node and located on the transit node, and using the identifiers as the first location information of the fault point. In this manner, the transit node is an upstream node of the fault point. The manner used by the transit node to perceive timeout of transmission between the transit node and the downstream node of the transit node may depend on the device vendor and the application scenario. For example, a Keepalive packet or a packet similar to the Keepalive packet is sent between the transit node and the downstream node of the transit node to keep connection. If the transit node fails to receive the packet within a specified reception time, the transit node may determine timeout of transmission between the transit node and its downstream node, and determine occurrence of a fault.

If the transit node in this embodiment is not an upstream node of the fault point, the transit node in this embodiment receives the first location information of the fault point sent by the downstream node of the transit node. Before obtaining the first location information of the fault point, the downstream node of the transit node in this embodiment stores a local label forwarding entry corresponding to the LDP LSP and stores source and destination information of a label corresponding to the local label forwarding entry corresponding to the LDP LSP. The downstream node of the transit node in this embodiment sends the first location information of the fault point to its upstream node (that is, the transit node in this embodiment) according to the stored local label forwarding entry corresponding to the LDP LSP and the stored source and destination information of the label corresponding to the local label forwarding entry corresponding to the LDP LSP.

Step 302: the transit node sends the first location information of the fault point to the ingress node of the LDP LSP according to a local label forwarding entry corresponding to the faulty LDP LSP and according to source and destination information of a label corresponding to the local label forwarding entry corresponding to the LDP LSP, so that the ingress node provides a user with the first location information of the fault point corresponding to the LDP LSP fault.

After obtaining the first location information of the fault point, the transit node in this embodiment sends the first location information of the fault point to the ingress node, so that the ingress node can provide the first location information of the fault point to the user after receiving the first location information of the fault point, and the user can determine the location of the fault point corresponding to the LDP LSP and perform locating fault cause conveniently.

In this embodiment, before obtaining the first location information of the fault point, the transit node stores a local label forwarding entry corresponding to the faulty LDP LSP and stores source and destination information of a label corresponding to the local label forwarding entry corresponding to the LDP LSP. The source and destination information of the label corresponding to the label forwarding entry corresponding to the LDP LSP, which is stored by the transit node in this embodiment, is actually a record of information about a label allocated by a downstream node of the node to the node for an FEC, and information about a label allocated by the node to its upstream node for the same FEC.

Optionally, the transit node in this embodiment may use, but without being limited to, the following manners to send the first location information of the fault point to the ingress node according to a local label forwarding entry corresponding to the LDP LSP and according to source and destination information of a label corresponding to the local label forwarding entry corresponding to the LDP LSP.

The transit node in this embodiment sends an LDP fault information transfer message to the ingress node according to the local label forwarding entry corresponding to the LDP LSP and according to the source and destination information of the label corresponding to the local label forwarding entry corresponding to the LDP LSP, where the LDP fault information transfer message carries the first location information of the fault point. The LDP fault information transfer message is a new type of LDP message, and is different from the existing label LDP message.

Alternatively, the transit node in this embodiment sends a label withdraw message to the ingress node according to the local label forwarding entry corresponding to the LDP LSP and according to the source and destination information of the label corresponding to the local label forwarding entry corresponding to the LDP LSP, where the label withdraw message carries the first location information of the fault point, and the label withdraw message is a result of extending a label withdraw message in the prior art.

Described from a perspective of the manner of carrying the first location information of the fault point, the foregoing two manners are mainly about the manner for the transit node in this embodiment to send the first location information of the fault point to the ingress node. For details of the two manners, reference may be made to the description in the embodiment shown in FIG. 1 regarding how the upstream node of the fault point sends the first location information of the fault point to the ingress node, which will not be described in detail herein again.

In an optional implementation manner, at least one node is connected between the transit node in this embodiment and the ingress node. The at least one node here is a transit node(s).

Based on this, an optional manner for the transit node in this embodiment to send the first location information of the fault point to the ingress node according to the local label forwarding entry corresponding to the LDP LSP and according to the source and destination information of the label corresponding to the local label forwarding entry corresponding to the LDP LSP includes: the transit node in this embodiment sends the first location information of the fault point to an upstream node of the transit node according to the local label forwarding entry corresponding to the LDP LSP and according to the source and destination information of the label corresponding to the local label forwarding entry corresponding to the LDP LSP, so that the upstream node of the transit node sends the first location information of the fault point to the ingress node. Before receiving the first location information of the fault point, the upstream node of the transit node in this embodiment stores the local label forwarding entry corresponding to the LDP LSP and stores the source and destination information of the label corresponding to the local label forwarding entry corresponding to the LDP LSP. In this way, after receiving the first location information of the fault point, the upstream node of the transit node in this embodiment can forward the first location information of the fault point to its upstream node according to the locally stored label forwarding entry corresponding to the LDP LSP and the locally stored source and destination information of the label corresponding to the local label forwarding entry, until the first location information arrives at the ingress node.

It is hereby pointed out that before receiving the first location information of the fault point, each node on the LDP LSP in this embodiment stores the local label forwarding entry corresponding to the LDP LSP corresponding to the fault point and stores the source and destination information of the label corresponding to the label forwarding entry, for providing path information for forwarding the first location information of the fault point to its upstream node. Each node uses the same manner to store the label forwarding entry corresponding to the LDP LSP and store the source and destination information of the label corresponding to the local label forwarding entry. This embodiment takes the transit node in this embodiment as an example for description. Before obtaining the first location information of the fault point, the transit node in this embodiment uses, but without being limited to, the following manners to store the local label forwarding entry corresponding to the LDP LSP and store the source and destination information of the label corresponding to the local label forwarding entry corresponding to the LDP LSP.

Before obtaining the first location information of the fault point, the transit node in this embodiment flags, but does not delete, the local label forwarding entry corresponding to the LDP LSP and stores the source and destination information of the label corresponding to the local label forwarding entry corresponding to the LDP LSP, where the flagged local label forwarding entry corresponding to the LDP LSP is no longer used for forwarding LDP LSP traffic.

Alternatively, before obtaining the first location information of the fault point, the transit node in this embodiment copies the local label forwarding entry corresponding to the LDP LSP and copies the source and destination information of the label corresponding to the local label forwarding entry corresponding to the LDP LSP, and deletes the original local label forwarding entry corresponding to the LDP LSP and the original source and destination information of the label corresponding to the local label forwarding entry corresponding to the LDP LSP and stores the copied local label forwarding entry corresponding to the LDP LSP and the copied source and destination information of the label corresponding to the local label forwarding entry corresponding to the LDP LSP. For detailed description of storing the label forwarding entry, reference may be made to the description about the embodiment shown in FIG. 1, which will not be described in detail herein again.

It is hereby pointed out that the foregoing manner primarily describes a process of the transit node providing a forwarding path according to the stored label forwarding entry and the stored source and destination information of the label and sending the first location information of the fault point to the ingress node. In that manner, the manner of carrying the first location information of the fault point may be any manner described above.

In an optional implementation manner, the transit node in this embodiment may also send the first location information of the fault point to a network management device so that the network management device performs troubleshooting.

An implementation manner for the transit node in this embodiment to send the first location information of the fault point to the network management device includes: the transit node sends link fault alarm information to the network management device, where the link fault alarm information includes the first location information of the fault point. In this way, after receiving the link fault alarm information sent by the transit node, the network management device performs troubleshooting for the link.

The following describes an optional implementation manner of the link fault alarm information, where the link fault alarm information includes content shown in Table 2.

TABLE 2

| Content in the link fault alarm information | Meaning |
| --- | --- |
| ifIndex | Interface index |
| ifAdminStatus | Interface administration status |
| ifOperStatus | Interface operation status |
| ifDescr | Interface name |

As seen from the above description, in the method for sending location information of a fault point provided in this embodiment, after obtaining first location information of a fault point on a link traversed by an LDP LSP, a transit node sends the first location information of the fault point to an ingress node of the LDP LSP, so that the ingress node can provide the first location information of the fault point to a user or a network management device, thereby providing conditions for the user or the network management device to determine a location of the fault point corresponding to an LDP LSP fault and perform troubleshooting according to the determined location of the fault point, and improving efficiency of troubleshooting specific to the LDP LSP fault.

Figure 4:
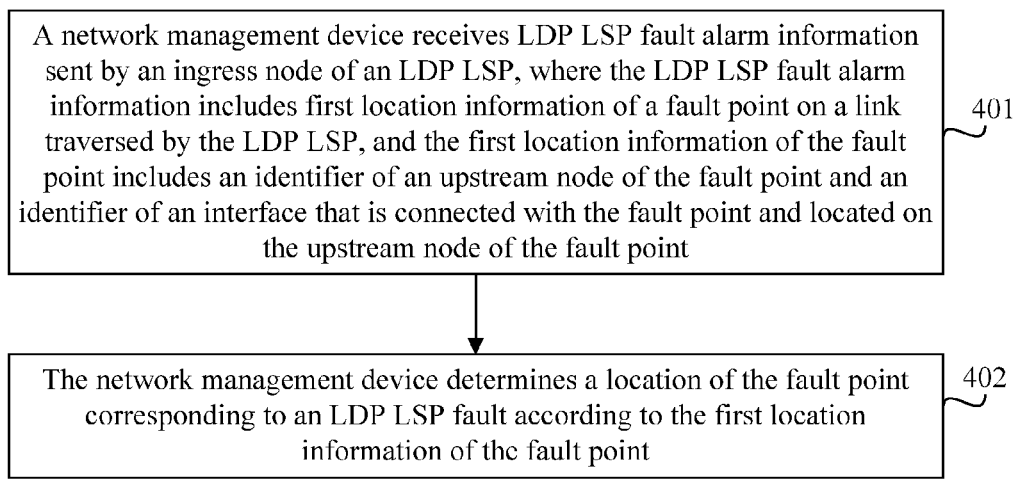
FIG. 4 is a flowchart of a method for processing fault alarm information according to an embodiment of the present invention.

FIG. 4 is a flowchart of a method for processing fault alarm information according to an embodiment of the present invention. As shown in FIG. 4, the method in this embodiment includes:

Step 401: A network management device receives LDP LSP fault alarm information sent by an ingress node of an LDP LSP, where the LDP LSP fault alarm information includes first location information of a fault point on a link traversed by the LDP LSP, and the first location information of the fault point includes an identifier of an upstream node of the fault point and an identifier of an interface that is connected to the fault point and located on the upstream node of the fault point.

Step 402: the network management device determines a location of the fault point corresponding to an LDP LSP fault according to the first location information of the fault point.

The network management device in this embodiment is primarily used to monitor a network, receive alarm information reported by each node in the network, and perform troubleshooting according to the alarm information. In a VPN network, multiple layers of protocols run on the link. Therefore, when the link is faulty, protocols on all layers will raise alarms, and the network management device will receive much alarm information. For every piece of alarm information received, the network management device needs to perform troubleshooting specific to the fault corresponding to the alarm information.

After the LDP LSP is torn due to a link fault, the ingress node of the LDP LSP sends LDP LSP fault alarm information to the network management device, where the LDP LSP fault alarm information carries the first location information of the fault point. After receiving the LDP LSP fault alarm information, the network management device, in one aspect, may learn that occurrence of the LDP LSP fault and the need of troubleshooting, and, in another aspect, may learn the location of the fault point on the link. Then, the network management device determines the location of the fault point on the link according to the first location information of the fault point, and then performs troubleshooting.

In the prior art, after receiving the LDP LSP fault alarm information sent by the ingress node, the network management device only learns occurrence of the LDP LSP fault and the need of troubleshooting, but is unaware of the location of the fault point. Moreover, before the network management device receives the LDP LSP fault alarm information, the LDP LSP has been torn. Therefore, the network management device cannot perform troubleshooting by using a forwarding path of the LDP LSP which is existent before the occurrence of the fault, but can only examine the entire network according to information such as network understandings and LDP LSP configuration requirements, and make repeated attempts to set up an LDP LSP. It can be seen that, in the method for processing fault alarm information in this embodiment, a network management device obtains the first location information of a fault point corresponding to the LDP LSP fault among LDP LSP fault alarm information sent by an ingress node of the LDP LSP, and determines a location of the fault point corresponding to the LDP LSP fault on the link according to the first location information, thereby providing conditions for performing troubleshooting for the location of the fault point and improving efficiency of troubleshooting specific to the LDP LSP fault.

In an optional implementation manner, considering that the amount of data of generated LDP LSP fault alarms is relatively large and the network device will have a heavier processing burden if the network scale is large, in order to reduce the number of the generated LDP LSP fault alarms, the ingress node of each LDP LSP in this embodiment sends the LDP LSP fault alarm information to the network management device only if determining that the LDP LSP actually bears VPN traffic and that no other LDP LSP is available for bearing the VPN traffic borne by the LDP LSP when the LDP LSP is faulty. Based on this, in this implementation manner, the LDP LSP fault alarm information received by the network management device is sent by the ingress node when determining that the LDP LSP bears VPN traffic and that no other LDP LSP is available for bearing the VPN traffic borne by the LDP LSP.

Figure 5:
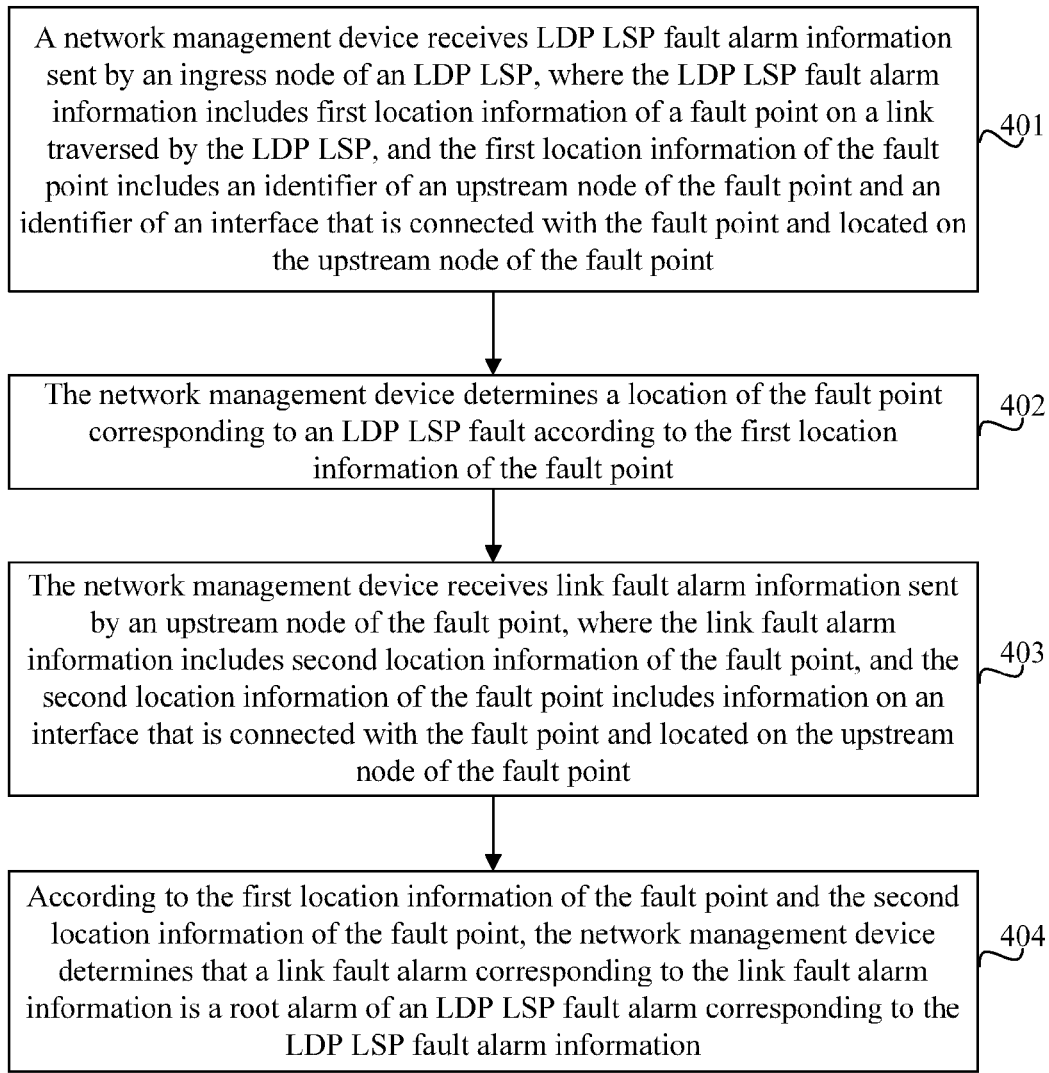
FIG. 5 is a flowchart of a method for processing fault alarm information according to another embodiment of the present invention.

In an optional implementation manner, the implementation manner may be implemented based on all the above implementation manners. As shown in FIG. 5, the method in this embodiment further includes:

Step 403: the network management device receives link fault alarm information sent by an upstream node of the fault point, where the link fault alarm information includes second location information of the fault point, and the second location information of the fault point includes information on an interface that is connected to the fault point and located on the upstream node of the fault point.

The information on the interface that is connected to the fault point and located on the upstream node of the fault point includes but is not limited to: identification information, operation state information, and administration state information of the interface. The identification information of the interface may be any information that can uniquely identify the interface, such as an IP address, a name, or an index of the interface. Preferably, in the second location information of the fault point, the name or index of the interface may be used to identify the interface.

Step 404: According to the first location information of the fault point and the second location information of the fault point, the network management device determines that a link fault alarm corresponding to the link fault alarm information is a root cause alarm of an LDP LSP fault alarm corresponding to the LDP LSP fault alarm information.

Not only the ingress node of the LDP LSP can discover the LDP LSP fault and send to the network management device the LDP LSP fault alarm information that carries the first location information of the fault point, but also the upstream node of the fault point can discover the link fault and send the link fault alarm information to the network management device, where the link fault alarm information carries the second location information of the fault point. The process of the upstream node of the fault point sending the link fault alarm information to the network management device is independent of the process of the ingress node sending the LDP LSP fault alarm information to the network management device. That is, the order between step 403 and steps 401 and 402 is not limited. This embodiment is described through an example where step 403 is performed after steps 401 and 402; however, step 403 may also be performed before step 401.

In this way, after receiving the link fault alarm information sent by the upstream node of the fault point, in one aspect, the network management device learns occurrence of the link fault and the need of troubleshooting, and, in another aspect, will learn the second location information of the fault point, and therefore determines the location of the fault point on the link. Subsequently, the network management device performs troubleshooting according to the determined location of the fault point.

Generally, a certain correlation exists between alarms generated by the same node, and a root cause alarm can be distinguished from a derivative alarm according to the correlation between the alarms. If a root cause alarm and a derivative alarm coexist, only the root cause alarm needs to be handled. That is, once the root cause alarm is handled, the derivative alarm is cleared consequently. For example, a link fault (LinkDown) alarm generated by an upstream node of the fault point is a root cause alarm of LDP session fault (Down) alarms generated by the node. For example, an LDP LSP fault alarm generated by an ingress node is a root cause alarm of VPN fault alarms generated by the node.

In addition, a certain relationship also exists between alarms generated by different network elements. For example, causality exists between a link fault alarm generated by an upstream node of the fault point and an LDP LSP fault alarm generated by an ingress node. However, due to the connectionless feature of the IP network, no effective correlation exists between the link fault alarm generated by the upstream node of the fault point and the LDP LSP fault alarm generated by the ingress node. In this embodiment, the network management device not only analyzes correlation between different alarms raised by the same node, but also analyzes correlation between alarms raised by different nodes.

In this embodiment, the LDP LSP fault alarm information sent by the ingress node includes the location information of the fault point, and the link fault alarm information sent by the upstream node of the fault point also includes the location information of the fault point. Therefore, by using the first location information of the fault point and the second location information of the fault point, the network management device in this embodiment can correlate the LDP LSP fault alarm raised by the ingress node with the link fault alarm raised by the upstream node of the fault point, and work out the causality between the alarms. Specifically, the network management device may determine that the link fault alarm raised by the upstream node of the fault point is a root cause alarm of the LDP LSP fault alarm raised by the ingress node, and that the LDP LSP fault alarm raised by the ingress node is a derivative alarm of the link fault alarm raised by the upstream node of the fault point. One scenario is: the LDP LSP fault alarm raised by the ingress node is directly used as a derivative alarm of the link fault alarm raised by the upstream node of the fault point, and the link fault alarm raised by the upstream node of the fault point is directly used as a root cause alarm of the LDP LSP fault alarm raised by the ingress node. Another scenario is: the LDP LSP fault alarm raised by the ingress node is indirectly used as a derivative alarm of the link fault alarm raised by the upstream node of the fault point, and the link fault alarm raised by the upstream node of the fault point is indirectly used as a root cause alarm of the LDP LSP fault alarm raised by the ingress node. For example, the LDP LSP session fault alarm running on the link raised by the upstream node of the fault point is directly used as a root cause alarm of the LDP LSP fault alarm raised by the ingress node, and the link fault alarm raised by the upstream node of the fault point is directly used as a root cause alarm of the LDP session fault alarm running on the link raised by the upstream node of the fault point.

Specifically, it is assumed that the first location information of the fault point includes an identifier of an upstream node of a fault point and an IP address of an interface that is connected to the fault point and located on the upstream node of the fault point, and that the second location information of the fault point includes information such as an index, a name, an administration state, and an operation state of the interface that is connected to the fault point and located on the upstream node of the fault point. In this case, when receiving the link fault alarm sent by the upstream node of the fault point, the network management device can learn the identifier of the upstream node of the fault point; and, based on the identifier of the upstream node of the fault point and the identifier of the upstream node of the fault point that is included in the first location information, determine that the upstream node of the fault point is the same node; and then, by looking up a preset corresponding relationship between the IP address of the interface and the name and index of the interface (for example, the corresponding relationship may be pre-stored in a database), determine that the IP address of the interface that is connected to the fault point and located on the upstream node of the fault point corresponds to the same interface as the index and name of the interface that is connected to the fault point and located on the upstream node of the fault point. Therefore, it is determined that the fault point corresponding to the link fault alarm raised by the upstream node of the fault point is the same as the fault point corresponding to the LDP LSP fault alarm raised by the ingress node, and, in practical troubleshooting, the troubleshooting is specific to this fault point. Therefore, the network management device may determine that the link fault alarm raised by the upstream node of the fault point is a root cause alarm of the LDP LSP fault alarm raised by the ingress node, and that the LDP LSP fault alarm raised by the ingress node is a derivative alarm of the link fault alarm raised by the upstream node of the fault point.

As analyzed above, when the network management device performs troubleshooting, the troubleshooting is required only for the root cause alarm. Once the root cause alarm is cleared, other derivative alarms are cleared consequently, which can relieve the burden of the network management device.

In an optional implementation manner of this embodiment, the LDP LSP fault alarm information sent by the ingress node further includes a fault cause corresponding to the fault point. Based on this, the network management device can obtain the fault cause corresponding to the fault point from the LDP LSP fault alarm information. Optionally, the network management device determines, according to the first location information of the fault point and the second location information of the fault point, that the link fault alarm corresponding to the link fault alarm information is a root cause alarm of the LDP LSP fault alarm corresponding to the LDP LSP fault alarm information. Such a determination may be made according to the first location information of the fault point, the second location information of the fault point, and the fault cause corresponding to the fault point, the network management device determines that the link fault alarm corresponding to the link fault alarm information is a root cause alarm of the LDP LSP fault alarm corresponding to the LDP LSP fault alarm information. In this way, the network management device can determine the relationship between the link fault alarm raised by the upstream node of the fault point and the LDP LSP fault alarm raised by the ingress node more quickly.

Considering that in a practical network, multiple (assuming N) LDP LSPs may "traverse" a node, and one LDP LSP may bear multiple (assuming M) VPN services, M×N alarms may be analyzed and determined as derivative alarms of a link fault alarm, and a network maintenance engineer needs to handle only one alarm instead of the M×N alarms, which facilitates network maintenance significantly.

Figure 6:
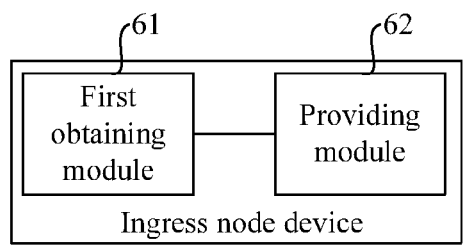
FIG. 6 is a schematic structural diagram of an ingress node device according to an embodiment of the present invention.

FIG. 6 is a schematic structural diagram of an ingress node device according to an embodiment of the present invention. As shown in FIG. 6, the ingress node device in this embodiment may be an ingress node of an LDP LSP, such as a PE device. The ingress node device in this embodiment includes a first obtaining module 61 and a providing module 62.

The first obtaining module 61 is configured to obtain first location information of a fault point on a link traversed by the LDP LSP, where the first location information of the fault point includes an identifier of an upstream node of the fault point and an identifier of an interface that is connected to the fault point and located on the upstream node of the fault point.

The providing module 62 is connected to the first obtaining module 61 and is configured to provide the user with the first location information of the fault point that is obtained by the first obtaining module 61, so that the user determines a location of the fault point corresponding to an LDP LSP fault.

In an optional implementation manner, the first obtaining module 61 may use, but without being limited to, the following manners to obtain the first location information of the fault point:

The first obtaining module 61 is specifically configured to: when perceiving a fault of a link between the ingress node device in this embodiment and the downstream node of the ingress node device or perceiving a fault of the downstream node of the ingress node device in this embodiment, obtain an identifier of the ingress node device in this embodiment and an identifier of an interface that is connected to the downstream node of the ingress node device in this embodiment and located on the ingress node device in this embodiment, and use the identifiers as the first location information of the fault point, where the ingress node device in this embodiment is an upstream node of the fault point; or The first obtaining module 61 is specifically configured to: when perceiving mismatch between configuration information corresponding to the LDP LSP on the ingress node device in this embodiment and configuration information corresponding to the LDP LSP on the downstream node of the ingress node device in this embodiment, obtain an identifier of the ingress node device in this embodiment and an identifier of an interface that is connected to the downstream node of the ingress node device in this embodiment and located on the ingress node device in this embodiment, and use the identifiers as the first location information of the fault point, where the ingress node device in this embodiment is an upstream node of the fault point.

Alternatively, the first obtaining module 61 is specifically configured to: when perceiving timeout of transmission between the ingress node device in this embodiment and the downstream node of the ingress node device in this embodiment, obtain an identifier of the ingress node device in this embodiment and an identifier of an interface that is connected to the downstream node of the ingress node device in this embodiment and located on the ingress node device in this embodiment, and use the identifiers as the first location information of the fault point in this embodiment, where the ingress node device in this embodiment is an upstream node of the fault point.

Alternatively, the first obtaining module 61 is specifically configured to receive the first location information of the fault point sent by the upstream node of the fault point.

In an optional implementation manner, the first obtaining module 61 being specifically configured to receive the first location information of the fault point sent by the upstream node of the fault point includes: the first obtaining module 61 being specifically configured to receive an LDP fault information transfer message sent by the upstream node of the fault point, where the LDP fault information transfer message includes the first location information of the fault point; or, the first obtaining module 61 being specifically configured to receive a label withdraw message sent by the upstream node of the fault point, where the label withdraw message includes the first location information of the fault point.

In an optional implementation manner, at least one node is connected between the ingress node device in this embodiment and the upstream node of the fault point. Therefore, the first obtaining module 61 being specifically configured to receive the first location information of the fault point sent by the upstream node of the fault point includes: the first obtaining module 61 being specifically configured to receive the first location information of the fault point that is sent by the upstream node of the fault point by using at least one of the nodes between the ingress node device in this embodiment and the upstream node of the fault point.

Before receiving the first location information of the fault point sent by a downstream node, each of the at least one node stores a local label forwarding entry corresponding to the LDP LSP and stores source and destination information of a label corresponding to the local label forwarding entry corresponding to the LDP LSP, so that each of the at least one node sends the first location information of the fault point to its upstream node according to the stored label forwarding entry corresponding to the LDP LSP and the stored source and destination information of the label corresponding to the label forwarding entry corresponding to the LDP LSP.

In an optional implementation manner, the providing module 62 is specifically configured to provide the first location information of the fault point to a network management device, so that the user determines a location of the fault point corresponding to the LDP LSP fault by using the network management device; or, the providing module 62 is specifically configured to receive a query command input by the user, and display the first location information of the fault point to the user according to the query command, so that the user determines the location of the fault point corresponding to the LDP LSP fault, where the query command includes identification information of the LDP LSP.

Optionally, the providing module 62 being specifically configured to provide the first location information of the fault point to a network management device so that the user determines a location of the fault point corresponding to the LDP LSP fault by using the network management device, includes: the providing module 62 being specifically configured to generate LDP LSP fault alarm information that carries the first location information of the fault point, and send the LDP LSP fault alarm information to the network management device so that the user determines the location of the fault point corresponding to the LDP LSP fault by using the network management device; or, the providing module 62 being specifically configured to receive a location information obtaining request sent by the network management device, and provide the first location information of the fault point to the network management device according to the location information obtaining request, so that the user determines the location of the fault point corresponding to the LDP LSP fault by using the network management device, where the location information obtaining request includes identification information of the LDP LSP.

Further, optionally, the providing module 62 being specifically configured to generate LDP LSP fault alarm information that carries the first location information of the fault point includes: the providing module 62 being specifically configured to: when it is determined that the LDP LSP bears VPN traffic and that no other LDP LSP is available for bearing the VPN traffic borne by the LDP LSP, generate the LDP LSP fault alarm information that carries the first location information of the fault point.

Optionally, the providing module 62 is further configured to add a fault cause corresponding to the fault point into the LDP LSP fault alarm information and send it to the network management device.

Function modules of the ingress node device provided in this embodiment may be used to perform corresponding processes in the method for sending location information of a fault point shown in FIG. 1. Their working principles are not detailed here any further, and reference may be made to the description in the method embodiments.

According to the ingress node device provided in this embodiment, after obtaining first location information of a fault point on a link traversed by an LDP LSP, the ingress node device provides the obtained first location information of the fault point to a user, so that the user can determine a location of the fault point corresponding to an LDP LSP fault, thereby providing conditions for performing troubleshooting according to the determined location of the fault point and improving efficiency of troubleshooting specific to the LDP LSP fault.

Figure 7:
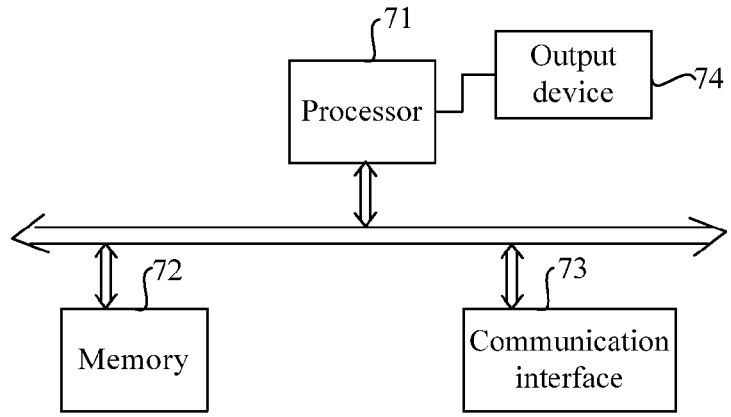
FIG. 7 is a schematic structural diagram of an ingress node device according to another embodiment of the present invention.

FIG. 7 is a schematic structural diagram of an ingress node device according to another embodiment of the present invention. As shown in FIG. 7, the ingress node device in this embodiment includes at least one processor 71, and a memory 72, which are connected over a bus. The bus may be an industry standard architecture (ISA) bus, a peripheral component (PCI) bus, or an extended industry standard architecture (EISA) bus, or the like. The bus is categorized into address bus, data bus, control bus, and so on. For ease of illustration, in FIG. 7, only one bold line is used to represent the bus, but it does not mean that there is only one bus or only one type of bus.

The memory 72 is configured to store executable program codes; and the processor 71 reads the executable program codes stored in the memory 72 to run a program corresponding to the executable program codes, so as to: obtain first location information of a fault point on a link traversed by the LDP LSP, where the first location information of the fault point includes an identifier of an upstream node of the fault point and an identifier of an interface that is connected to the fault point and located on the upstream node of the fault point; and provide the first location information of the fault point to a user so that the user determines a location of the fault point corresponding to an LDP LSP fault.

Optionally, the ingress node device in this embodiment may further include a communication interface 73, which is connected to the processor 71 and the memory 72 over buses.

Optionally, over the communication interface 73, the processor 71 may obtain the first location information of the fault point. For example, the communication interface 73 receives the first location information of the fault point sent by the downstream node of the ingress node device in this embodiment, and then transmits the first location information to the processor 71 over the bus.

Optionally, this embodiment of the present invention may further include an output device 74 connected to the processor 71, and the output device may be specifically a display, a voice-based output device, or the like. The processor 71 may provide the first location information of the fault point to the user by using the output device 74. In addition, the processor 71 may, over the communication interface 73, send the first location information of the fault point to another device communicationally connected to this device, and the another device provides the first location information to the user.

In addition, optionally, the embodiment of the present invention may further include an input device corresponding to the output device 74, and the input device may be specifically a keyboard, a mouse, a screen (handwriting screen, keypad screen, or the like), or a voice-based input device, or the like.

The ingress node device provided in this embodiment may be used to perform corresponding processes in the method for sending location information of a fault point shown in FIG. 1. Their working principles are not detailed here any further, and reference may be made to the description in the method embodiments.

According to the ingress node device provided in this embodiment, after obtaining first location information of a fault point on a link traversed by an LDP LSP, the ingress node device provides the obtained first location information of the fault point to a user, so that the user can determine a location of the fault point corresponding to an LDP LSP fault, thereby providing conditions for performing troubleshooting according to the determined location of the fault point and improving efficiency of troubleshooting specific to the LDP LSP fault.

Figure 8:
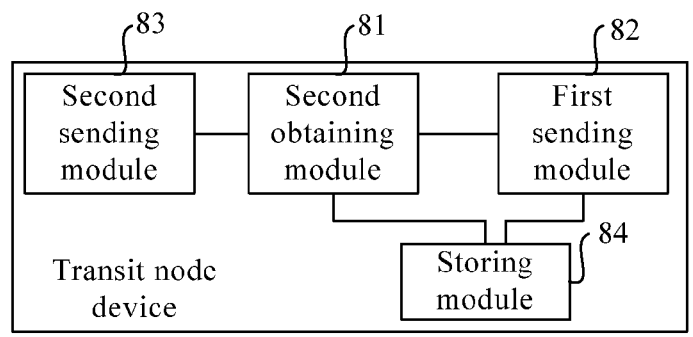
FIG. 8 is a schematic structural diagram of a transit node device according to an embodiment of the present invention.

FIG. 8 is a schematic structural diagram of a transit node device according to an embodiment of the present invention. The transit node device provided in this embodiment may be a transit node on an LDP LSP, such as a P device. As shown in FIG. 8, the transit node device in this embodiment includes a second obtaining module 81 and a first sending module 82.

The second obtaining module 81 is configured to obtain first location information of a fault point on a link traversed by the LDP LSP, where the first location information of the fault point includes an identifier of an upstream node of the fault point and an identifier of an interface that is connected to the fault point and located on the upstream node of the fault point.

The first sending module 82 is connected to the second obtaining module 81, and is configured to send the first location information of the fault point, which is obtained by the second obtaining module 81, to the ingress node of the LDP LSP according to a local label forwarding entry corresponding to the LDP LSP and according to source and destination information of a label corresponding to the local label forwarding entry corresponding to the LDP LSP, so that the ingress node provides a user with the first location information of the fault point corresponding to the LDP LSP fault. Before the second obtaining module 81 obtains the first location information of the fault point, the transit node device in this embodiment stores the local label forwarding entry corresponding to the LDP LSP and stores the source and destination information of the label corresponding to the local label forwarding entry corresponding to the LDP LSP.

In an optional implementation manner, the second obtaining module 81 may use, but without being limited to, the following manners to obtain the first location information of the fault point:

The second obtaining module 81 is specifically configured to: when perceiving a fault of a link between the transit node device in this embodiment and the downstream node of the transit node device or perceiving a fault of the downstream node of the transit node device in this embodiment, obtain an identifier of the transit node device in this embodiment and an identifier of an interface that is connected to the downstream node of the transit node device in this embodiment and located on the transit node device in this embodiment, and use the identifiers as the first location information of the fault point, where the transit node device in this embodiment is an upstream node of the fault point.

Alternatively, the second obtaining module 81 is specifically configured to: when perceiving mismatch between configuration information corresponding to the LDP LSP on the transit node device in this embodiment and configuration information corresponding to the LDP LSP on the downstream node of the transit node device in this embodiment, obtain an identifier of the transit node device in this embodiment and an identifier of an interface that is connected to the downstream node of the transit node device in this embodiment and located on the transit node device in this embodiment, and use the identifiers as the first location information of the fault point, where the transit node device in this embodiment is an upstream node of the fault point.

Alternatively, the second obtaining module 81 is specifically configured to: when perceiving timeout of transmission between the transit node device in this embodiment and the downstream node of the transit node device in this embodiment, obtain an identifier of the transit node device in this embodiment and an identifier of an interface that is connected to the downstream node of the transit node device in this embodiment and located on the transit node device in this embodiment, and use the identifiers as the first location information of the fault point, where the transit node device in this embodiment is an upstream node of the fault point.

Alternatively, the second obtaining module 81 is specifically configured to receive the first location information of the fault point sent by the downstream node of the transit node device in this embodiment. Before obtaining the first location information of the fault point, the downstream node of the transit node device in this embodiment stores the local label forwarding entry corresponding to the LDP LSP and stores source and destination information of the label corresponding to the local label forwarding entry. The downstream node of the transit node device in this embodiment sends the first location information of the fault point to the transit node device in this embodiment according to the stored local label forwarding entry corresponding to the LDP LSP and the stored source and destination information of the label corresponding to the local label forwarding entry corresponding to the LDP LSP.

In an optional implementation manner, the first sending module 82 is specifically configured to send an LDP fault information transfer message to the ingress node according to the local label forwarding entry corresponding to the LDP LSP and according to the source and destination information of the label corresponding to the local label forwarding entry corresponding to the LDP LSP, where the LDP fault information transfer message includes the first location information of the fault point.

Alternatively, the first sending module 82 is specifically configured to send a label withdraw message to the node according to the local label forwarding entry corresponding to the LDP LSP and according to the source and destination information of the label corresponding to the local label forwarding entry corresponding to the LDP LSP, where the label withdraw message includes the location information of the fault point.

In an optional implementation manner, at least one node is connected between the transit node device in this embodiment and the ingress node. Therefore, the first sending module 82 is specifically configured to send the first location information of the fault point to the upstream node of the transit node in this embodiment according to the local label forwarding entry corresponding to the LDP LSP and according to the source and destination information of the label corresponding to the local label forwarding entry corresponding to the LDP LSP, so that the upstream node of the transit node in this embodiment sends the first location information of the fault point to the ingress node. Before receiving the first location information of the fault point, the upstream node of the transit node in this embodiment stores the local label forwarding entry corresponding to the LDP LSP and stores the source and destination information of the label corresponding to the local label forwarding entry corresponding to the LDP LSP.

In an optional implementation manner, the transit node device in this embodiment further includes a second sending module 83. The second sending module 83 is configured to send second location information of the fault point to the network management device. Specifically, the second sending module 83 is configured to: when the transit node device in this embodiment is an upstream node of the fault point, send link fault alarm information to the network management device, where the link fault alarm information includes the second location information of the fault point, and the second location information of the fault point includes information on an interface that is connected to the fault point and located on the transit node in this embodiment. The information on the interface that is connected to the fault point and located on the transit node in this embodiment includes but is not limited to: identification information of the interface, operation state of the interface, and administration state of the interface. The identification information of the identifier may be an index, a name or an IP address of the interface. Preferably, in the second location information, the name or index of the interface is used to identify the interface.

In an optional implementation manner, the transit node device in this embodiment further includes a storing module 84.

The storing module 84 is connected to the second obtaining module 81 and is configured to: before the second obtaining module 81 obtains the first location information of the fault point, store the local label forwarding entry corresponding to the LDP LSP and store the source and destination information of the label corresponding to the local label forwarding entry corresponding to the LDP LSP. Optionally, the storing module 84 is further connected to the first sending module 82, and is configured to provide the first sending module 82 with the local label forwarding entry corresponding to the LDP LSP and the source and destination information of the label corresponding to the local label forwarding entry corresponding to the LDP LSP.

Optionally, the storing module 84 is specifically configured to: before the second obtaining module 81 obtains the first location information of the fault point, flag the local label forwarding entry corresponding to the LDP LSP and the source and destination information of the label corresponding to the local label forwarding entry corresponding to the LDP LSP, where the flagged local label forwarding entry corresponding to the LDP LSP is no longer used for forwarding LDP LSP traffic.

Alternatively, the storing module 84 is specifically configured to: before the second obtaining module 81 obtains the first location information of the fault point, copy the local label forwarding entry corresponding to the LDP LSP and copy the source and destination information of the label corresponding to the local label forwarding entry corresponding to the LDP LSP, and delete the original local label forwarding entry corresponding to the LDP LSP and the original source and destination information of the label corresponding to the local label forwarding entry corresponding to the LDP LSP and store the copied local label forwarding entry corresponding to the LDP LSP and the copied source and destination information of the label corresponding to the local label forwarding entry corresponding to the LDP LSP.

Function modules of the transit node device provided in this embodiment may be used to perform corresponding processes in the method for sending location information of a fault point shown in FIG. 3. Their working principles are not detailed here any further, and reference may be made to the description in the method embodiments.

According to the transit node device provided in this embodiment, after obtaining first location information of a fault point on a link traversed by an LDP LSP, the transit node device sends the first location information of the fault point to an ingress node of the LDP LSP, so that the ingress node can provide the first location information of the fault point corresponding to an LDP LSP fault to a user, so that the user can determine a location of the fault point corresponding to the LDP LSP fault, thereby providing conditions for performing troubleshooting according to the determined location of the fault point and improving efficiency of troubleshooting specific to the LDP LSP fault.

Figure 9:
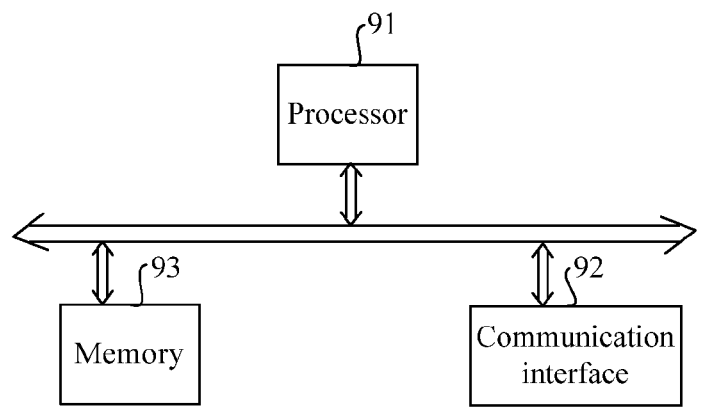
FIG. 9 is a schematic structural diagram of a transit node device according to another embodiment of the present invention.

FIG. 9 is a schematic structural diagram of a transit node device according to another embodiment of the present invention. As shown in FIG. 9, the transit node device in this embodiment includes a processor 91, a memory 93, and a communication interface 92, which are connected over a bus. The bus may be an ISA bus, a PCI bus, or an EISA bus, or the like. The bus is categorized into address bus, data bus, control bus, and so on. For ease of illustration, in FIG. 9, only one bold line is used to represent the bus, but it does not mean that there is only one bus or only one type of bus.

The processor 91 is configured to: obtain first location information of a fault point on a link traversed by the LDP LSP, where the first location information of the fault point includes an identifier of an upstream node of the fault point and an identifier of an interface that is connected to the fault point and located on the upstream node of the fault point; and send the first location information of the fault point to an ingress node of an LDP LSP over the communication interface 92 according to a local label forwarding entry corresponding to the LDP LSP and according to source and destination information of a label corresponding to the local label forwarding entry corresponding to the LDP LSP, so that the ingress node provides a user with the first location information of the fault point corresponding to the LDP LSP fault.

The memory 93 is configured to store a program to be executed by the processor. Optionally, before the processor 91 obtains the first location information of the fault point, the transit node device in this embodiment may store the local label forwarding entry corresponding to the LDP LSP and store the source and destination information of the label corresponding to the local label forwarding entry corresponding to the LDP LSP. Therefore, the memory 93 may be further configured to store the local label forwarding entry corresponding to the LDP LSP and the source and destination information of the local label corresponding to the local label forwarding entry corresponding to the LDP LSP. In addition, the memory 93 may be further configured to store the first location information of the fault point that is obtained by the processor 91. For example, after obtaining the first location information of the fault point, the processor 91 may store the first location information of the fault point into the memory 93 over a bus connected to the memory 93.

Optionally, over the communication interface 92, the processor 91 may obtain the first location information of the fault point. For example, the communication interface 92 may receive the first location information of the fault point sent by a downstream node of the transit node in this embodiment, and send the first location information of the fault point to the processor 91 over the bus connected to the processor 91 (such as a data bus).

Optionally, after obtaining the first location information of the fault point, the processor 91 may transmit the first location information to the communication interface 92 over a data bus connected to the communication interface 92, and then send a control command to the communication interface 92 over a control bus connected to the communication interface 92, so as to control the communication interface 92 to send the first location information of the fault point.

The transit node device provided in this embodiment may be used to perform corresponding processes in the method for sending location information of a fault point shown in FIG. 3. Their working principles are not detailed here any further, and reference may be made to the description in the method embodiments.

According to the transit node device provided in this embodiment, after obtaining first location information of a fault point on a link traversed by an LDP LSP, the transit node device sends the first location information of the fault point to an ingress node of the LDP LSP, so that the ingress node can provide the first location information of the fault point corresponding to an LDP LSP fault to a user and the user can determine a location of the fault point corresponding to the LDP LSP fault, thereby providing conditions for performing troubleshooting according to the determined location of the fault point and improving efficiency of troubleshooting specific to the LDP LSP fault.

Figure 10:
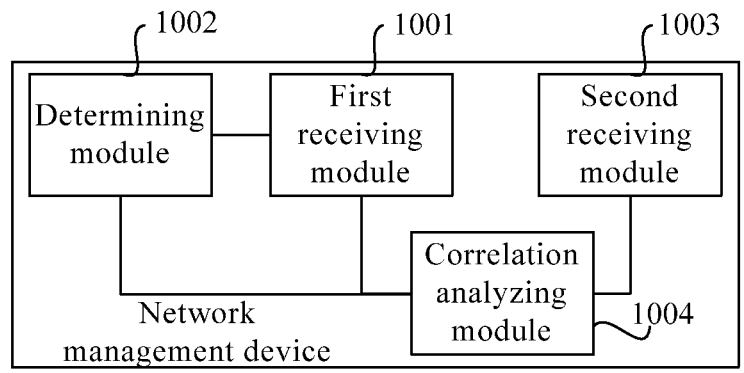
FIG. 10 is a schematic structural diagram of a network management device according to an embodiment of the present invention.

FIG. 10 is a schematic structural diagram of a network management device according to an embodiment of the present invention. As shown in FIG. 10, the network management device in this embodiment includes a first receiving module 1001 and a determining module 1002.

The first receiving module 1001 is configured to receive LDP LSP fault alarm information sent by an ingress node of an LDP LSP, where the LDP LSP fault alarm information includes first location information of a fault point on a link traversed by the LDP LSP, and the first location information of the fault point includes an identifier of an upstream node of the fault point and an identifier of an interface that is connected to the fault point and located on the upstream node of the fault point.

The determining module 1002 is connected to the first receiving module 1001 and is configured to determine a location of the fault point corresponding to an LDP LSP fault according to the first location information of the fault point that is received by the first receiving module 1001.

In an optional implementation manner, the LDP LSP fault alarm information received by the first receiving module 1001 is sent by the ingress node when determining that the LDP LSP bears VPN traffic and that no other LDP LSP is available for bearing the VPN traffic borne by the LDP LSP. That is good for reducing the amount of LDP LSP fault alarm information received by the network management device in this embodiment and relieving the burden of the network management device in this embodiment.

In an optional implementation manner, the network management device in this embodiment further includes a second receiving module 1003 and a correlation analyzing module 1004.

The second receiving module 1003 is configured to: receive link fault alarm information sent by an upstream node of the fault point, where the link fault alarm information includes second location information of the fault point, and the second location information of the fault point includes information on an interface that is connected to the fault point and located on the upstream node of the fault point.

The correlation analyzing module 1004 is connected to the first receiving module 1001 and the second receiving module 1003, and is configured to: according to the first location information of the fault point that is received by the first receiving module 1001 and the second location information of the fault point that is received by the second receiving module 1003, determine that a link fault alarm corresponding to the link fault alarm information is a root cause alarm of an LDP LSP fault alarm corresponding to the LDP LSP fault alarm information.

In an optional implementation manner, the LDP LSP fault alarm information further includes a fault cause corresponding to the fault point. Based on this, the determining module 1002 is further configured to obtain the fault cause corresponding to the fault point from the LDP LSP fault alarm information. Correspondingly, the correlation analyzing module 1004 is specifically configured to: according to the first location information of the fault point, the second location information of the fault point, and the fault cause corresponding to the fault point, determine that the link fault alarm corresponding to the link fault alarm information is a root cause alarm of the LDP LSP fault alarm corresponding to the LDP LSP fault alarm information.

Function modules of the network management device provided in this embodiment may be used to perform corresponding processes in the method for processing fault alarm information shown in FIG. 4 or FIG. 5. Their working principles are not detailed here any further, and reference may be made to the description in the method embodiments.

The network management device in this embodiment obtains first location information of a fault point on a link traversed by an LDP LSP among LDP LSP fault alarm information sent by an ingress node of the LDP LSP, and determines a location of the fault point corresponding to an LDP LSP fault on the link according to the first location information, thereby providing conditions for performing troubleshooting according to the determined location of the fault point and improving efficiency of troubleshooting specific to the LDP LSP fault.

Figure 11:
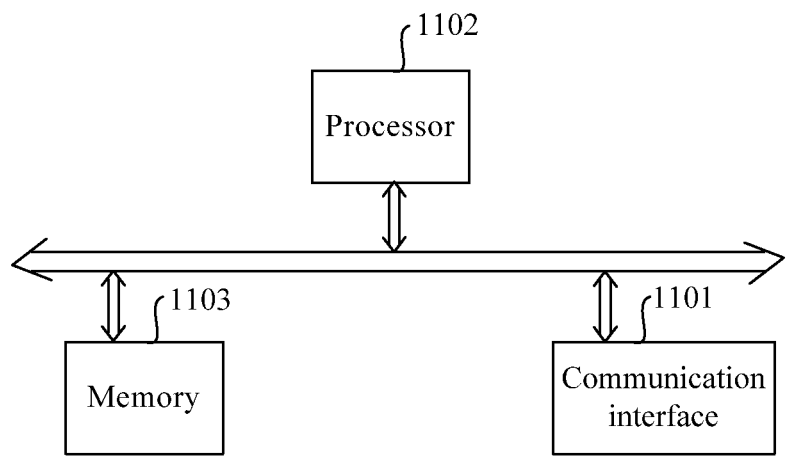
FIG. 11 is a schematic structural diagram of a network management device according to another embodiment of the present invention.

FIG. 11 is a schematic structural diagram of a network management device according to another embodiment of the present invention. As shown in FIG. 11, the network management device in this embodiment includes a communication interface 1101, a processor 1102, and a memory 1103.

The communication interface 1101 is configured to receive LDP LSP fault alarm information sent by an ingress node of an LDP LSP, where the LDP LSP fault alarm information includes first location information of a fault point on a link traversed by the LDP LSP, and the first location information of the fault point includes an identifier of an upstream node of the fault point and an identifier of an interface that is connected to the fault point and located on the upstream node of the fault point.

The processor 1102 is configured to obtain LDP LSP fault alarm information sent by the ingress node of the LDP LSP over the communication interface 1101, and determine a location of the fault point corresponding to an LDP LSP fault according to the first location information of the fault point.

The memory 1103 is configured to store a program to be executed by the processor 1102.

Optionally, the memory 1103 in this embodiment may be further configured to store the LDP LSP fault alarm information and the first location information of the fault point that are received by the communication interface 1101.

The network management device provided in this embodiment may be used to perform corresponding processes in the method for processing fault alarm information shown in FIG. 4 or FIG. 5. Their working principles are not detailed here any further, and reference may be made to the description in the method embodiments.

It should be noted that in specific implementation, the communication interface mentioned in the foregoing embodiments (73 in FIG. 7, 92 in FIG. 9, and 1101 in FIG. 11) may be a stand-alone physical structure capable of communicating with other devices, such as a computer network adapter or an antenna, or definitely may be multiple separated physical structures, for example, one stand-alone antenna for the function of receiving information, and other antennas for the function of transmitting information.

The network management device in this embodiment obtains first location information of a fault point on a link traversed by an LDP LSP among LDP LSP fault alarm information sent by an ingress node of an LDP LSP, and determines a location of the fault point corresponding to an LDP LSP fault on the link according to the first location information, thereby providing conditions for performing troubleshooting according to the determined location of the fault point and improving efficiency of troubleshooting specific to the LDP LSP fault.

It should be noted that the described apparatus embodiments are merely exemplary, the units described as separate parts may be physically separated or not, and parts displayed as units may be physical units or not, that is, may be placed in one location or distributed on a plurality of network elements. Part of or all of the modules may be selected according to actual needs to achieve the objectives of the solutions of the embodiments. A person of ordinary skill in the art may understand and implement the embodiments without making creative efforts.

According to the descriptions of the foregoing implementation manners, persons skilled in the art can clearly understand that the present invention can be implemented by software in addition to necessary universal hardware, or by dedicated hardware including dedicated integrated circuits, dedicated central processing units (CPUs), dedicated memories, and dedicated components, but, in most circumstances, the former is preferred. Based on such understandings, the essence of the technical solutions of the present invention or the part that makes contributions to the prior art can be embodied in a software product. The computer software product may be stored in a readable storage medium such as a computer floppy disk, a universal serial bus (USB) flash disk, a mobile hard disk, a read-only memory (ROM), a random access memory (RAM), a magnetic disk, or an optical disk, where the storage medium incorporates several instructions causing a computer device (such as a personal computer, a server, or a network device) to perform the method specified in each embodiment of the present invention.

The embodiments in this specification are all described in a progressive manner, mutual reference may be made to the same or similar part of the embodiments, and each embodiment focuses on differences from other embodiments. In particular, the apparatus and system embodiments are basically similar to the method embodiment and are therefore described briefly, and reference may be made to the corresponding part in the description of the method embodiment.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for sending location information of a fault point, comprising:
   receiving, by an ingress node of a Label Distribution Protocol (LDP) Label Switch Path (LSP), first location information of a fault point on a link traversed by the LDP LSP sent by an upstream node of the fault point using at least one node, wherein the at least one node is connected between the ingress node and the upstream node of the fault point and the first location information of the fault point comprises the identifier of an upstream node of the fault point and an identifier of an interface that is connected to the fault point and located on the upstream node of the fault point, wherein the upstream node of the fault point connects to the fault point directly and locates in an upstream direction of the fault point; and
   wherein before receiving the first location information of the fault point sent by a downstream node of each of the at least one node, the each of the at least one node stores a local label forwarding entry corresponding to the LDP LSP, and stores source and destination information of a label corresponding to the local label forwarding entry corresponding to the LDP LSP so that each of the at least one node sends the first location information of the fault point to an upstream node of the each of the at least one node according to the stored label forwarding entry corresponding to the LDP LSP and the stored source and destination information of the label corresponding to the label forwarding entry corresponding to the LDP LSP;
   providing, by the ingress node, the first location information of the fault point to a network management device so that the user determines the location of the fault point corresponding to the LDP LSP fault using the network management device.

2. The method for sending location information of a fault point according to claim 1, wherein the first location information of the fault point is carried in an LDP fault information transfer message or a label withdraw message.

3. The method for sending location information of a fault point according to claim 1, wherein providing, by the ingress node, the first location information of the fault point to the network management device so that the user determines the location of the fault point corresponding to the LDP LSP fault using the network management device, comprises:
   generating, by the ingress node, LDP LSP fault alarm information that carries the first location information of the fault point, and sending, by the ingress node, the LDP LSP fault alarm information to the network management device so that the user determines the location of the fault point corresponding to the LDP LSP fault using the network management device.

4. The method for sending location information of a fault point according to claim 3, wherein generating, by the ingress node, LDP LSP fault alarm information that carries the first location information of the fault point, comprises generating, by the ingress node, the LDP LSP fault alarm information that carries the first location information of the fault point when the ingress node determines that the LDP LSP bears virtual private network (VPN) traffic and that no other LDP LSP is available for bearing the VPN traffic borne by the LDP LSP.

5. The method for sending location information of a fault point according to claim 3, further comprising adding, by the ingress node, a fault cause corresponding to the fault point into the LDP LSP fault alarm information.

6. A method for sending location information of a fault point, comprising:
obtaining, by a transit node on a Label Distribution Protocol (LDP) Label Switch Path (LSP), first location information of a fault point on a link traversed by the LDP LSP, wherein the first location information of the fault point comprises an identifier of an upstream node of the fault point and an identifier of an interface that is connected to the fault point and located on the upstream node of the fault point, wherein the upstream node of the fault point connects to the fault point directly and locates in an upstream direction of the fault point; and
sending, by the transit node, the first location information of the fault point to an ingress node of the LDP LSP according to a local label forwarding entry corresponding to the LDP LSP and according to source and destination information of a label corresponding to the local label forwarding entry corresponding to the LDP LSP so that the ingress node provides a user with the first location information of the fault point corresponding to an LDP LSP fault using a network management device so that the user can determine a location of the fault point corresponding to an LDP LSP fault using the network management device, wherein the transit node stores the local label forwarding entry corresponding to the LDP LSP and stores the source and destination information of the label corresponding to the local label forwarding entry corresponding to the LDP LSP before the transit node obtains the first location information of the fault point.

7. The method for sending location information of a fault point according to claim 6, wherein the obtaining, by the transit node on the LDP LSP, first location information of the fault point on the link traversed by the LDP LSP, comprises at least one of the following:
when the transit node perceives a fault of a link between the transit node and a downstream node of the transit node or perceives a fault of the downstream node of the transit node, obtaining an identifier of the transit node and an identifier of an interface that is connected to the downstream node of the transit node and located on the transit node, and using the identifiers as the first location information of the fault point, wherein the transit node is an upstream node of the fault point;
when the transit node perceives mismatch between configuration information corresponding to the LDP LSP on the transit node and configuration information corresponding to the LDP LSP on the downstream node of the transit node, obtaining an identifier of the transit node and an identifier of an interface that is connected to the downstream node of the transit node and located on the transit node, and using the identifiers as the first location information of the fault point, wherein the transit node is an upstream node of the fault point;
when the transit node perceives timeout of transmission between the transit node and the downstream node of the transit node, obtaining an identifier of the transit node and an identifier of an interface that is connected to the downstream node of the transit node and located on the transit node, and using the identifiers as the first location information of the fault point, wherein the transit node is an upstream node of the fault point; and
receiving, by the transit node, the first location information of the fault point sent by the downstream node of the transit node, wherein before obtaining the first location information of the fault point, the downstream node of the transit node stores the local label forwarding entry corresponding to the LDP LSP and stores the source and destination information of the label corresponding to the local label forwarding entry; and the downstream node of the transit node sends the first location information of the fault point to the transit node according to the stored local label forwarding entry corresponding to the LDP LSP and the stored source and destination information of the label corresponding to the local label forwarding entry corresponding to the LDP LSP.

8. The method for sending location information of a fault point according to claim 6, wherein sending, by the transit node, the first location information of the fault point to the ingress node of the LDP LSP according to the local label forwarding entry corresponding to the LDP LSP and according to source and destination information of the label corresponding to the local label forwarding entry corresponding to the LDP LSP, comprises at least one of the following:
sending, by the transit node, an LDP fault information transfer message to the ingress node according to the local label forwarding entry corresponding to the LDP LSP and according to the source and destination information of the label corresponding to the local label forwarding entry corresponding to the LDP LSP, wherein the LDP fault information transfer message comprises the first location information of the fault point; and
sending, by the transit node, a label withdraw message to the ingress node according to the local label forwarding entry corresponding to the LDP LSP and according to the source and destination information of the label corresponding to the local label forwarding entry corresponding to the LDP LSP, wherein the label withdraw message comprises the location information of the fault point.

9. The method for sending location information of a fault point according to claim 6, wherein at least one node is connected between the transit node and the ingress node, wherein sending, by the transit node, the first location information of the fault point to the ingress node of the LDP LSP according to the local label forwarding entry corresponding to the LDP LSP and according to source and destination information of the label corresponding to the local label forwarding entry corresponding to the LDP LSP, comprises sending, by the transit node, the first location information of the fault point to an upstream node of the transit node according to the local label forwarding entry corresponding to the LDP LSP and according to the source and destination information of the label corresponding to the local label forwarding entry corresponding to the LDP LSP so that the upstream node of the transit node sends the first location information of the fault point to the ingress node, and wherein before receiving the first location information of the fault point, the upstream node of the transit node stores the local label forwarding entry corresponding to the LDP LSP and stores the source and destination information of the label corresponding to the local label forwarding entry corresponding to the LDP LSP.

10. The method for sending location information of a fault point according to claim 6, further comprising sending, by the transit node, link fault alarm information to a network management device when the transit node is an upstream node of the fault point, wherein the link fault alarm information comprises second location information of the fault point, and wherein the second location information of the fault point comprises information on an interface that is connected to the fault point and located on the transit node.

11. The method for sending location information of a fault point according to claim 6, wherein storing, by the transit node, the local label forwarding entry corresponding to the LDP LSP and storing the source and destination information of the label corresponding to the local label forwarding entry corresponding to the LDP LSP before obtaining the first location information of the fault point, comprises at least one of the following:

before obtaining the first location information of the fault point, flagging, by the transit node, the local label forwarding entry corresponding to the LDP LSP, and the source and destination information of the label corresponding to the local label forwarding entry corresponding to the LDP LSP, wherein the flagged local label forwarding entry corresponding to the LDP LSP is no longer used for forwarding LDP LSP traffic; and before obtaining the first location information of the fault point, copying, by the transit node, the local label forwarding entry corresponding to the LDP LSP, and copying the source and destination information of the label corresponding to the local label forwarding entry corresponding to the LDP LSP, and deleting the original local label forwarding entry corresponding to the LDP LSP and the original source and destination information of the label corresponding to the local label forwarding entry corresponding to the LDP LSP and storing the copied local label forwarding entry corresponding to the LDP LSP and the copied source and destination information of the label corresponding to the local label forwarding entry corresponding to the LDP LSP.

12. A method for processing fault alarm information, comprising:

receiving, by a network management device, Label Distribution Protocol (LDP) Label Switch Path (LSP) fault alarm information sent by an ingress node of a LDP LSP, wherein the LDP LSP fault alarm information comprises first location information of a fault point on a link traversed by the LDP LSP, and the first location information of the fault point comprises an identifier of an upstream node of the fault point and an identifier of an interface that is connected to the fault point and located on the upstream node of the fault point, wherein the upstream node of the fault point connects to the fault point directly and locates in an upstream direction of the fault point; and determining, by the network management device, a location of the fault point corresponding to an LDP LSP fault according to the first location information of the fault point;

wherein the first location information of the fault point is received by the ingress node and sent by the upstream node of the fault point using at least one node wherein the at least one node is connected between the ingress node and the upstream node of the fault point;

wherein before receiving the first location information of the fault point sent by a downstream node of each of the at least one node, the each of the at least one node stores a local label forwarding entry corresponding to the LDP LSP, and stores source and destination information of a label corresponding to the local label forwarding entry corresponding to the LDP LSP so that each of the at least one node sends the first location information of the fault point to an upstream node of the each of the at least one node according to the stored label forwarding entry corresponding to the LDP LSP and the stored source and destination information of the label corresponding to the label forwarding entry corresponding to the LDP LSP.

13. The method for processing fault alarm information according to claim 12, further comprising:

receiving, by the network management device, link fault alarm information sent by an upstream node of the fault point, wherein the link fault alarm information comprises second location information of the fault point, and the second location information of the fault point comprises information on an interface that is connected to the fault point and located on the upstream node of the fault point; and determining, by the network management device according to the first location information of the fault point and the second location information of the fault point, that a link fault alarm corresponding to the link fault alarm information is a root cause alarm of an LDP LSP fault alarm corresponding to the LDP LSP fault alarm information.

14. The method for processing fault alarm information according to claim 13, wherein the LDP LSP fault alarm information further comprises a fault cause corresponding to the fault point, wherein the method further comprises obtaining, by the network management device, the fault cause corresponding to the fault point from the LDP LSP fault alarm information, and wherein the determining, by the network management device according to the first location information of the fault point and the second location information of the fault point, that the link fault alarm corresponding to the link fault alarm information is the root cause alarm of the LDP LSP fault alarm corresponding to the LDP LSP fault alarm information, comprises determining, by the network management device according to the first location information of the fault point, the second location information of the fault point, and the fault cause corresponding to the fault point, that the link fault alarm corresponding to the link fault alarm information is a root cause alarm of the LDP LSP fault alarm corresponding to the LDP LSP fault alarm information.

15. An ingress node device for obtaining location information of a fault point and providing the location information to a user, comprising:

a processor, and a memory storing executable instructions when executed by the processor cause the ingress node device to perform the following steps:

receive first location information of the fault point on a link traversed by a Label Distribution Protocol (LDP) Label Switch Path (LSP) sent by an upstream node of the fault point using at least one node, wherein the at least one node is connected between the ingress node device and the upstream node of the fault point and the first location information of the fault point comprises an identifier of the upstream node of the fault point and an identifier of an interface that is connected to the fault point and located on the upstream node of the fault point, wherein the upstream node of the fault point connects to the fault point directly and locates in an upstream direction of the fault point, and wherein before receiving the first location information of the fault point sent by a downstream node of each of the at least one node, each of the at least one node stores a local label forwarding entry corresponding to the LDP LSP, and stores source and destination information of a label corresponding to the local label forwarding entry corresponding to the LDP LSP so that each of the at least one node sends the first location information of the fault point to an upstream node of the each of the at least one node according to the stored label forwarding entry corresponding to the LDP LSP and the stored source and destination information of the label corresponding to the label forwarding entry corresponding to the LDP LSP; and provide, by the ingress node, the first location information of the fault point to a network management device so that the user determines the location of the fault point corresponding to the LDP LSP fault using the network management device.

16. The ingress node device according to claim 15, wherein the first location information of the fault point is carried in an LDP fault information transfer message or a label withdraw message.

17. The ingress node device according to claim 15, wherein the instructions further cause the ingress node device to:
generate LDP LSP fault alarm information that carries the first location information of the fault point; and
send the LDP LSP fault alarm information to the network management device so that the user determines the location of the fault point corresponding to the LDP LSP fault using the network management device.

18. The ingress node device according to claim 17, wherein the instructions further cause the ingress node device to generate the LDP LSP fault alarm information that carries the first location information of the fault point when the ingress node determines that the LDP LSP bears virtual private network (VPN) traffic and that no other LDP LSP is available for bearing the VPN traffic borne by the LDP LSP.

19. A transit node device for sending location information of a fault point, comprising:
a processor, and
a memory storing executable instructions when executed by the processor cause the transit node device to perform the following steps:
obtain first location information of a fault point on a link traversed by a Label Distribution Protocol (LDP) Label Switch Path (LSP), wherein the first location information of the fault point comprises an identifier of an upstream node of the fault point and an identifier of an interface that is connected to the fault point and located on the upstream node of the fault point wherein the upstream node of the fault point connects to the fault point directly and locates in an upstream direction of the fault point; and
send the first location information of the fault point to an ingress node of the LDP LSP according to a local label forwarding entry corresponding to the LDP LSP and according to source and destination information of a label corresponding to the local label forwarding entry corresponding to the LDP LSP so that the ingress node provides a user with the first location information of the fault point corresponding to an LDP LSP fault using a network management device so that the user can determine a location of the fault point corresponding to an LDP LSP fault using the network management device, wherein the transit node stores the local label forwarding entry corresponding to the LDP LSP and stores the source and destination information of the label corresponding to the local label forwarding entry corresponding to the LDP LSP before the transit node obtains the first location information of the fault point.

20. The transit node device according to claim 19, wherein the instructions further cause the transit node device to perform at least one item of the following:
when the transit node perceives a fault of a link between the transit node and a downstream node of the transit node or perceives a fault of the downstream node of the transit node, obtain an identifier of the transit node and an identifier of an interface that is connected to the downstream node of the transit node and located on the transit node, and use the identifiers as the first location information of the fault point, wherein the transit node is an upstream node of the fault point;
when the transit node perceives mismatch between configuration information corresponding to the LDP LSP on the transit node and configuration information corresponding to the LDP LSP on the downstream node of the transit node, obtain an identifier of the transit node and an identifier of an interface that is connected to the downstream node of the transit node and located on the transit node, and use the identifiers as the first location information of the fault point, wherein the transit node is an upstream node of the fault point;
when the transit node perceives timeout of transmission between the transit node and the downstream node of the transit node, obtain an identifier of the transit node and an identifier of an interface that is connected to the downstream node of the transit node and located on the transit node, and use the identifiers as the first location information of the fault point, wherein the transit node is an upstream node of the fault point; and
receive, by the transit node, the first location information of the fault point sent by the downstream node of the transit node, wherein before obtaining the first location information of the fault point, the downstream node of the transit node stores the local label forwarding entry corresponding to the LDP LSP and stores the source and destination information of the label corresponding to the local label forwarding entry, and wherein the downstream node of the transit node sends the first location information of the fault point to the transit node according to the stored local label forwarding entry corresponding to the LDP LSP and the stored source and destination information of the label corresponding to the local label forwarding entry corresponding to the LDP LSP.

21. The transit node device according to claim 19, wherein the instructions further cause the transit node device to perform at least one item of the following:
before obtaining the first location information of the fault point, flag the local label forwarding entry corresponding to the LDP LSP, and the source and destination information of the label corresponding to the local label forwarding entry corresponding to the LDP LSP, wherein the flagged local label forwarding entry corresponding to the LDP LSP is no longer used for forwarding LDP LSP traffic; and
before obtaining the first location information of the fault point, copy the local label forwarding entry corresponding to the LDP LSP, copy the source and destination information of the label corresponding to the local label forwarding entry corresponding to the LDP LSP, and delete the original local label forwarding entry corresponding to the LDP LSP and the original source and destination information of the label corresponding to the local label forwarding entry corresponding to the LDP LSP and storing the copied local label forwarding entry corresponding to the LDP LSP and the copied source and destination information of the label corresponding to the local label forwarding entry corresponding to the LDP LSP.

22. The transit node device according to claim 19, wherein the memory further stores instructions when executed by the processor cause the transit node device to send link fault alarm information to the network management device when the transit node is an upstream node of the fault point, wherein the link fault alarm information comprises second location information of the fault point, and wherein the second location information of the fault point comprises information on an interface that is connected to the fault point and located on the transit node.

23. A network management device for processing fault alarm information, comprising:
   a processor, and
   a memory storing executable instructions when executed by the processor cause the network management device to perform the following steps:
      receive Label Distribution Protocol (LDP) Label Switch Path (LSP) fault alarm information sent by an ingress node of a LDP LSP, wherein the LDP LSP fault alarm information comprises first location information of a fault point on a link traversed by the LDP LSP, and the first location information of the fault point comprises an identifier of an upstream node of the fault point and an identifier of an interface that is connected to the fault point and located on the upstream node of the fault point, wherein the upstream node of the fault point connects to the fault point directly and locates in an upstream direction of the fault point; and
      determine a location of the fault point corresponding to an LDP LSP fault according to the first location information of the fault point,
   wherein the first location information of the fault point is received by the ingress node and sent by the upstream node of the fault point using at least one node wherein the at least one node is connected between the ingress node and the upstream node of the fault point, and
   wherein before receiving the first location information of the fault point sent by a downstream node of each of the at least one node, the each of the at least one node stores a local label forwarding entry corresponding to the LDP LSP, and stores source and destination information of a label corresponding to the local label forwarding entry corresponding to the LDP LSP so that each of the at least one node sends the first location information of the fault point to an upstream node of the each of the at least one node according to the stored label forwarding entry corresponding to the LDP LSP and the stored source and destination information of the label corresponding to the label forwarding entry corresponding to the LDP LSP.

24. The network management device according to claim 23, wherein the memory further stores instructions when executed by the processor cause the network management device to:
   receive link fault alarm information sent by an upstream node of the fault point, wherein the link fault alarm information comprises second location information of the fault point, and wherein the second location information of the fault point comprises information on an interface that is connected to the fault point and located on the upstream node of the fault point; and
   determine that a link fault alarm corresponding to the link fault alarm information is a root cause alarm of an LDP LSP fault alarm corresponding to the LDP LSP fault alarm information according to the first location information of the fault point and the second location information of the fault point.

25. The network management device according to claim 24, wherein the LDP LSP fault alarm information further comprises a fault cause corresponding to the fault point which is carried in the LDP LSP fault alarm information, and wherein the instructions further cause the transit node device to determine that the link fault alarm corresponding to the link fault alarm information is a root cause alarm of the LDP LSP fault alarm corresponding to the LDP LSP fault alarm information according to the first location information of the fault point, the second location information of the fault point, and the fault cause corresponding to the fault point.

26. A non-transitory computer readable medium storing codes when executed by a processor of a computer system cause the computer system to perform steps of:
   receive first location information of a fault point on a link traversed by a Label Distribution Protocol (LDP) Label Switch Path (LSP) sent by an upstream node of the fault point using at least one node, wherein the at least one node is connected between the ingress node and the upstream node of the fault point and the first location information of the fault point comprises an identifier of the upstream node of the fault point and an identifier of an interface that is connected to the fault point and located on the upstream node of the fault point, wherein the upstream node of the fault point connects to the fault point directly and locates in an upstream direction of the fault point, and wherein before receiving the first location information of the fault point sent by a downstream node of each of the at least one node, the each of the at least one node stores a local label forwarding entry corresponding to the LDP LSP, and stores source and destination information of a label corresponding to the local label forwarding entry corresponding to the LDP LSP so that each of the at least one node sends the first location information of the fault point to an upstream node of the each of the at least one node according to the stored label forwarding entry corresponding to the LDP LSP and the stored source and destination information of the label corresponding to the label forwarding entry corresponding to the LDP LSP; and
   provide, by the ingress node, the first location information of the fault point to a network management device so that the user determines the location of the fault point corresponding to the LDP LSP fault using the network management device.

27. The non-transitory computer readable medium of claim 26, wherein the codes when executed further cause the computer system to:
   generate LDP LSP fault alarm information that carries the first location information of the fault point; and
   send the LDP LSP fault alarm information to the network management device so that the user determines the location of the fault point corresponding to the LDP LSP fault using the network management device.

28. The non-transitory computer readable medium of claim 27, wherein the codes when executed further cause the computer system to generate the LDP LSP fault alarm information that carries the first location information of the fault point when the ingress node determines that the LDP LSP bears virtual private network (VPN) traffic and that no other LDP LSP is available for bearing the VPN traffic borne by the LDP LSP.

29. A non-transitory computer readable medium storing codes when executed by a processor of a computer system cause the computer system to perform steps of:
- obtain first location information of a fault point on a link traversed by a Label Distribution Protocol (LDP) Label Switch Path (LSP), wherein the first location information of the fault point comprises an identifier of an upstream node of the fault point and an identifier of an interface that is connected to the fault point and located on the upstream node of the fault point wherein the upstream node of the fault point connects to the fault point directly and locates in an upstream direction of the fault point; and
- send the first location information of the fault point to an ingress node of the LDP LSP according to a local label forwarding entry corresponding to the LDP LSP and according to source and destination information of a label corresponding to the local label forwarding entry corresponding to the LDP LSP so that the ingress node provides a user with the first location information of the fault point corresponding to an LDP LSP fault using a network management device so that the user can determine a location of the fault point corresponding to an LDP LSP fault using the network management device, wherein the transit node stores the local label forwarding entry corresponding to the LDP LSP and stores the source and destination information of the label corresponding to the local label forwarding entry corresponding to the LDP LSP before the transit node obtains the first location information of the fault point.

30. The non-transitory computer readable medium of claim 29, wherein the codes when executed further cause the computer system to perform at least one item of the following:
- when the transit node perceives a fault of a link between the transit node and a downstream node of the transit node or perceives a fault of the downstream node of the transit node, obtain an identifier of the transit node and an identifier of an interface that is connected to the downstream node of the transit node and located on the transit node, and using the identifiers as the first location information of the fault point, wherein the transit node is an upstream node of the fault point;
- when the transit node perceives mismatch between configuration information corresponding to the LDP LSP on the transit node and configuration information corresponding to the LDP LSP on the downstream node of the transit node, obtain an identifier of the transit node and an identifier of an interface that is connected to the downstream node of the transit node and located on the transit node, and using the identifiers as the first location information of the fault point, wherein the transit node is an upstream node of the fault point;
- when the transit node perceives timeout of transmission between the transit node and the downstream node of the transit node, obtain an identifier of the transit node and an identifier of an interface that is connected to the downstream node of the transit node and located on the transit node, and using the identifiers as the first location information of the fault point, wherein the transit node is an upstream node of the fault point; and
- receive, by the transit node, the first location information of the fault point sent by the downstream node of the transit node, wherein before obtaining the first location information of the fault point, the downstream node of the transit node stores the local label forwarding entry corresponding to the LDP LSP and stores the source and destination information of the label corresponding to the local label forwarding entry, and wherein the downstream node of the transit node sends the first location information of the fault point to the transit node according to the stored local label forwarding entry corresponding to the LDP LSP and the stored source and destination information of the label corresponding to the local label forwarding entry corresponding to the LDP LSP.

31. The non-transitory computer readable medium of claim 29, wherein the codes when executed further cause the computer system to perform at least one item of the following:
- before obtaining the first location information of the fault point, flag the local label forwarding entry corresponding to the LDP LSP, and the source and destination information of the label corresponding to the local label forwarding entry corresponding to the LDP LSP, wherein the flagged local label forwarding entry corresponding to the LDP LSP is no longer used for forwarding LDP LSP traffic; and
- before obtaining the first location information of the fault point, copy the local label forwarding entry corresponding to the LDP LSP, and copying the source and destination information of the label corresponding to the local label forwarding entry corresponding to the LDP LSP, and deleting the original local label forwarding entry corresponding to the LDP LSP and the original source and destination information of the label corresponding to the local label forwarding entry corresponding to the LDP LSP and storing the copied local label forwarding entry corresponding to the LDP LSP and the copied source and destination information of the label corresponding to the local label forwarding entry corresponding to the LDP LSP.

32. The non-transitory computer readable medium of claim 29, further comprises codes when executed by the computer system cause the computer system to send link fault alarm information to a network management device when the transit node is an upstream node of the fault point, wherein the link fault alarm information comprises second location information of the fault point, and wherein the second location information of the fault point comprises information on an interface that is connected to the fault point and located on the transit node.

33. A non-transitory computer readable medium storing codes when executed by a processor of a computer system cause the computer system to perform steps of:
- receive Label Distribution Protocol (LDP) Label Switch Path (LSP) fault alarm information sent by an ingress node of a LDP LSP, wherein the LDP LSP fault alarm information comprises first location information of a fault point on a link traversed by the LDP LSP, and the first location information of the fault point comprises an identifier of an upstream node of the fault point and an identifier of an interface that is connected to the fault point and located on the upstream node of the fault point, wherein the upstream node of the fault point connects to the fault point directly and locates in an upstream direction of the fault point; and
- determine a location of the fault point corresponding to an LDP LSP fault according to the first location information of the fault point,
- wherein the first location information of the fault point is received by the ingress node and sent by the upstream node of the fault point using at least one node wherein the at least one node is connected between the ingress node and the upstream node of the fault point, and wherein before receiving the first location information of the fault point sent by a downstream node of each of the at least one node, the each of the at least one node stores a local label forwarding entry corresponding to the LDP LSP, and stores source and destination information of a label corresponding to the local label forwarding entry corresponding to the LDP LSP so that each of the at least one node sends the first location information of the fault point to an upstream node of the each of the at least one node according to the stored label forwarding entry corresponding to the LDP LSP and the stored source and destination information of the label corresponding to the label forwarding entry corresponding to the LDP LSP.

34. The non-transitory computer readable medium of claim 33, further comprises codes when executed by the computer system cause the computer system to:
  receive link fault alarm information sent by an upstream node of the fault point, wherein the link fault alarm information comprises second location information of the fault point, and wherein the second location information of the fault point comprises information on an interface that is connected to the fault point and located on the upstream node of the fault point; and
  determine that a link fault alarm corresponding to the link fault alarm information is a root cause alarm of an LDP LSP fault alarm corresponding to the LDP LSP fault alarm information according to the first location information of the fault point and the second location information of the fault point.

* * * * *